US007685896B2

(12) United States Patent
Haughton et al.

(10) Patent No.: US 7,685,896 B2
(45) Date of Patent: Mar. 30, 2010

(54) FLUID MIXING APPARATUS

(75) Inventors: Gary Haughton, Oakville (CA); Alexander Gris, Proton Station (CA)

(73) Assignee: Enersave Fluid Mixers Inc., Oakville, Ontario (CA)

( * ) Notice: Subject to any disclaimer, the term of this patent is extended or adjusted under 35 U.S.C. 154(b) by 0 days.

(21) Appl. No.: 12/047,642

(22) Filed: Mar. 13, 2008

(65) Prior Publication Data

US 2008/0219091 A1 Sep. 11, 2008

Related U.S. Application Data

(62) Division of application No. 10/533,914, filed on May 5, 2005, now Pat. No. 7,364,351.

(51) Int. Cl.
*F16H 21/22* (2006.01)
*F16H 21/18* (2006.01)
*B01F 11/00* (2006.01)

(52) U.S. Cl. .......................... 74/44; 366/258; 366/278; 366/332; 74/50

(58) Field of Classification Search .................... 74/44, 74/50; 366/258, 278, 332
See application file for complete search history.

(56) References Cited

U.S. PATENT DOCUMENTS

| | | | | |
|---|---|---|---|---|
| 41,373 | A * | 1/1864 | Glass | 74/50 |
| 92,164 | A * | 7/1869 | Cheatham | 74/44 |
| 103,908 | A * | 6/1870 | McFall | 74/50 |
| 187,054 | A * | 2/1877 | Sheffer | 74/50 |
| 220,474 | A * | 10/1879 | Haile | 74/50 |
| 616,830 | A * | 12/1898 | Dorsey | 74/50 |
| 653,834 | A * | 7/1900 | Winslow | 74/44 |
| 657,805 | A * | 9/1900 | Yates | 74/44 |
| 867,179 | A * | 9/1907 | Williams | 74/44 |
| 898,207 | A * | 9/1908 | Fleming | 74/44 |
| 918,508 | A * | 4/1909 | Colman | 366/332 |
| 923,644 | A * | 6/1909 | Griggs | 74/50 |
| 934,537 | A * | 9/1909 | Johnson | 74/44 |
| 945,639 | A * | 1/1910 | Taylor | 74/50 |
| 1,106,006 | A * | 8/1914 | Shores | 74/50 |
| 1,867,307 | A * | 7/1932 | Carpenter | 425/287 |
| 1,908,087 | A * | 5/1933 | Baer | 74/50 |
| 2,436,585 | A * | 2/1948 | Mangold | 366/315 |
| 2,951,471 | A * | 9/1960 | Hill | 74/50 |
| 4,289,040 | A * | 9/1981 | Haluko, Jr. | 74/50 |
| 7,399,112 | B2 * | 7/2008 | Haughton et al. | 366/258 |

* cited by examiner

*Primary Examiner*—Tony G Soohoo
(74) *Attorney, Agent, or Firm*—Patrick J. Hofbauer

(57) ABSTRACT

A reciprocating drive assembly is disclosed for use in a fluid mixer to impart reciprocating movement along a longitudinal axis to a shaft carrying a mixing head. The drive assembly includes a housing, a flywheel mounted for rotation about a rotational axis, a crank member projecting from the flywheel, and a yoke supported by the housing for movement along a yoke axis parallel to the longitudinal axis. The yoke is releasably connected to the shaft and has a linear race formed therein for receiving the crank member. Guide assemblies are connected to the housing and to the yoke for sliding engagement therewith along guide axes parallel to the yoke axis. The yoke is between the guide assemblies. The crank member is caused to translate linearly within the race, thereby urging the yoke to move along the yoke axis to effect longitudinal reciprocating movement of the mixing head.

6 Claims, 23 Drawing Sheets

FLUID MIXING APPARATUS

FIELD OF THE INVENTION

The present invention generally relates to the field of mineral ore processing, and more particularly, to a mixing apparatus and to uses thereof in the separation of minerals from mineral-bearing ores.

BACKGROUND OF THE INVENTION

Processes are known in the prior art which provide for the separation of minerals from mineral-bearing ores.

For example, in known processes used for the separation of copper from copper-bearing ores, illustrated diagrammatically in FIG. 1, non-oxidized ores 20 (which might contain as little as 0.5% copper, and typically contain iron sulfides) are processed in a crusher 22, with water 24, to form a slurry 26. The slurry 26 is then transferred to a flotation cell 28, and subjected to physical action, specifically, air sparging and mixing. As a result of the physical action, a substantial portion of the copper value in the slurry 26 rises to the surface of the flotation cell 28 as a froth 30, and is skimmed therefrom by a paddle mechanism 32, while the waste rock 33 ("gangue") remains in the bulk, and is ultimately passed from the cell 28 to a dryer 34 and discharged as tailings 36. This process of "froth separation" results from differences in wettability of copper as compared to other minerals, and is typically aided by chemical frothing and collector agents 38 added to the slurry 26, such that the froth 30 from such flotation contains 27% to 36% copper. Methylisobutyl carbonal (MIBC) is a typical frothing agent, and sodium xanthate, fuel oil, and VS M8 (a proprietary formulation) are typical collector agents.

The froth 30 is then fed to an oxygen smelter 40, and the copper and iron sulfides are oxidized at high temperature resulting in impure molten metal 42 (97%-99%, copper, with significant amounts of iron oxide) and gaseous sulfur dioxide 44. The impure metal 42 is then transferred to an electrolytic purification unit 46, which separates the impure metal 42 into 99.99% purity copper material 48 and slag 50.

The gaseous sulfur dioxide 44 is collected in a reactor 52 wherein it is scrubbed and mixed with water 24 to form sulphuric acid 54. The sulphuric acid 54 is suitably blended with water 24 and used to leach oxidized ores, typically by "heap leaching" an ore pile 56. The resultant copper-bearing acid 58 is known as "pregnant leach solution". Pregnant leach solution 58 is also obtained by mixing solutions of sulphuric acid 54, in vats 60, with the tailings 36 discharged from flotation operations, to dissolve the trace amounts of copper remaining therein.

The copper is "extracted" from the pregnant leachate 58 by mixing therewith, in a primary extraction step 62, organic solvent 64 (often kerosene) in which copper metal preferentially dissolves. Organic chemical chelators 66, which bind solubilized copper but not impurity metals, such as iron, are also often provided with the organic solvent, to further drive the migration of copper. Hydroxyoximes are exemplary in this regard.

In the primary extraction step 62, the copper is preferentially extracted into the organic phase according to the formula:

$$[CuSO_4]_{aqueous}+[2HR]_{organic} \Rightarrow [CuR_2]_{organic}+[H_2SO_4]_{aqueous}$$

where HR copper extractant (chelator)

The mixed phases are permitted to separate, into a copper-laden organic solvent 68 and a depleted leachate 70.

The depleted leachate 70 is then contacted with additional organic solvent 72 in a secondary extraction step 74, in the manner previously discussed, and allowed to settle, whereupon the phases separate into a lightly-loaded organic (which is recycled as solvent 64 in the primary extraction step) and a barren leachate or raffinate 76.

The barren leachate 76 is delivered to a coalescer 78 to remove therefrom entrained organics 80, which are recycled into the system; the thus-conditioned leachate 82 is then suitable for recycling into the leaching system.

The pregnant organic mixture 68 (produced in the primary extraction step 62) is stripped of its copper in a stripping operation 84 by the addition of an aqueous stripping solution of higher acidity 86 (to reverse the previous equation); after phase separation, a loaded electrolytic solution 88 ("rich electrolyte") remains, as well as an organic solvent, the latter being recycled as solvent 72 in the secondary extraction 74.

The rich electrolyte 88 is directed to an electrowinning unit 90. Electrowinning consists of the plating of solubilized copper onto the cathode and the evolution of oxygen at the anode. The chemical reactions involved with these processes are shown below $$\text{Cathode: } CuSO_4+2e^{1-} \Rightarrow Cu+SO_4^{2-}$$

$$\text{Anode: } H_2O \Rightarrow 2H^{+}+0.5O_2+2e^{1-}$$

This process results in copper metal 92, and a lean (copper-poor) electrolyte, which is recycled as stripping solution 86.

The combination of leaching, combined with extraction and electrowinning, is commonly known in the art as solvent extraction electrowinning, hereinafter referred to in this specification and in the claims as "SXEW".

In a known application of the described SXEW process, in both the primary 62 and secondary 74 extraction steps, the combined organic and aqueous phases are delivered through a series of mixing vessels (primary P, second S and tertiary T), and then to a settling tank ST, the primary mixing vessel P being about 8 feet in diameter and 12 feet in height, and stirred by a rotary mixer driven by a 20 horsepower motor, and each of the secondary S and tertiary T mixing vessels being about 12 feet in diameter and height, and stirred by a rotary mixer driven by a 7.5 horsepower motor. (The system of primary P, secondary S and tertiary T mixers, and settling tank ST, is replicated to meet volume flow requirements, with each system processing about 10,000 gpm). This provides a mixing regime wherein the organic and aqueous phases are intimately mixed for a period of time sufficient to allow copper exchange (to maximize copper recovery), yet relatively quickly separate substantially into organic and aqueous phases.

In a known application of the froth flotation process, a plurality of flotation cells 28, each being approximately 5 feet square and 4 feet high, are utilized, with pairs of cells sharing a 50 horsepower motor driving respecting rotary mixers (not shown). This provides a mixing regime sufficient to allow the air bubbles to carry the copper value to the surface.

Various modifications can be made to the rotary mixers in the extractors and in the flotation tanks of the foregoing process. However, the general configurations noted above have been found to provide relatively economical results, and significant variations therefrom can impact adversely upon economies. For example, an attempt to reduce energy costs by scaling-down the motors for the mixers would have consequent impacts either upon the copper recovery efficiency, or upon available process throughputs. Specifically, the relatively large motors employed are required to drive the sturdy (and therefore heavy) rotary mixers and shafts that are needed to withstand the torques caused by rotation; lower power motors would demand either lower blade speed or smaller blades, with consequent impacts upon-mixing and transfer efficiency.

SUMMARY OF THE INVENTION

According to one aspect of the invention, there is provided an apparatus for mixing fluids within a vessel having a contiguous sidewall centered about and defining a longitudinal axis. The mixing apparatus includes a mixing head, means for mounting the mixing head within the vessel, and means for imparting reciprocating longitudinal movement to the mixing head. The mixing head has a blade body for immersion in the fluids. The blade body has a first end, an opposed second end disposed in spaced relation thereto along a blade body axis, and a passageway extending therealong between the first and second ends. The passageway tapers from the first end to the second end. The blade body further has an inner surface and an outer surface. The outer surface of the blade body defines an inside blade diameter ID at the second end, and an outside blade diameter OD at the first end. The reciprocating longitudinal movement imparted to the mixing head is defined by a stroke length S, with a duration T for each cycle. The mixing apparatus is operable within a set of operational parameters defined by the equation:

$$80 \leqq 0.36 \times OD^2/ID^2 \times S/T \leqq 550,$$

where OD, ID and S are each expressed in inches, and T is expressed in minutes. By virtue of the reciprocating longitudinal movement imparted to the mixing head, a portion of the fluids is urged to flow through the passageway defined in the blade body to thereby encourage efficient mixing of the fluids in the vessel.

In an additional feature, the stroke length S is between 2 inches and 24 inches. Preferably, the stroke length S is between 4 inches and 16 inches. More preferably, the stroke length S is between 8 inches and 12 inches.

In a further additional feature, the OD:ID is greater than 1.0 and less than or equal to 1.7. Preferably, the OD:ID is between 1.5 and 1.7. In yet another feature, the stroke length S is between 8 and 12 inches; and the OD:ID is between 1.5 and 1.7

In another aspect of the invention, there is provided an apparatus for mixing fluids within a vessel having a contiguous sidewall centered about and defining a longitudinal axis. The mixing apparatus includes a housing, a mixing head, a shaft, a reciprocating drive assembly, and a linear bearing assembly. The housing is positionable above said vessel. The mixing head has a blade body for immersion in the fluids. The blade body has a first end, an opposed second end disposed in spaced relation thereto along a blade body axis, and a passageway extending therealong between the first and second ends. The passageway tapers from the first end to the second end. The shaft for supporting the mixing head and extends into the vessel. The reciprocating drive assembly is positioned substantially within the housing. The reciprocating drive assembly is operatively connected to the shaft to impart reciprocating longitudinal movement to the mixing head. The linear bearing assembly is mounted to the housing in surrounding relation to the shaft. The linear bearing assembly includes upper and lower bearing subassemblies for engagement with the shaft at respective upper and lower, longitudinally spaced, locations.

In an additional feature, the upper bearing subassembly is adapted and configured for sliding engagement with the shaft. In a further feature, the upper bearing subassembly includes a pair of mating bushing blocks surrounding the shaft for sliding engagement therewith. Each bushing block has a groove formed therein for slidingly receiving the shaft. The grooves of the bushing blocks are mounted in opposed relation one to the other with the shaft disposed therebetween when the bushing block are mated one with the other. Additionally, the groove formed in each bushing block is lined with a pad fabricated from a self-lubricating material. Further still, the pad has longitudinal ribs formed therein. In yet a further feature, the groove formed in each bushing block is generally semi-circular.

In another feature, the housing includes a base. The base supports one of the bearing blocks of the upper bearing subassembly. The shaft is mounted to extend downwardly through the base. Moreover, the base has a slot formed therein along an edge thereof for accommodating the shaft. The slot is configured to permit the shaft to be laterally received into, and laterally removed from, the slot. The slot is substantially aligned with the groove of the bearing block supported on the base.

In still another feature, the lower bearing subassembly is adapted and configured for rolling engagement with the shaft. Additionally, the housing includes a base. The lower bearing assembly has at least two roller assemblies carried below the base at the lower location. Further still, the lower bearing assembly includes at least one mounting member for operatively connecting the roller assemblies to at least one of the base and the upper bearing assembly. In yet an additional feature, the lower bearing assembly has a first mounting member attaching at least one roller assembly to the base, and a second mounting member attaching at least one roller assembly to the upper bearing assembly. In a still further feature, the upper bearing subassembly includes a pair of mating bushing blocks surrounding the shaft for sliding engagement therewith. The second mounting member is mounted to, and depending downwardly from, one of the bushing blocks.

In an additional feature, the lower bearing assembly has first and second roller assemblies supported by the first mounting member, and a third roller assembly supported by the second mounting member. The first, second and third roller assemblies are mounted in surrounding relation to the shaft.

In yet another aspect of the invention, there is provided a reciprocating drive assembly for use in a fluid mixer to impart reciprocating movement along a longitudinal axis to a shaft carrying a mixing head for immersion in fluids. The reciprocating drive assembly includes a housing, a flywheel, a crank member, a yoke, and first and second yoke assemblies. The flywheel is mounted for rotation about a rotational axis extending substantially normal to the longitudinal axis. The crank member projects from the flywheel in a direction parallel to the rotational axis. The yoke is supported by the housing for movement along a yoke axis disposed substantially parallel to the longitudinal axis. The yoke is releasably connected to the shaft. The yoke has a substantially linear race formed therein for receiving the crank member. The race is disposed within the yoke substantially normal to both the rotational axis and the yoke axis. The first and second guide assemblies are operatively connected to the housing, and to the yoke for sliding engagement therewith along a pair of guide axes extending substantially parallel to the yoke axis. The first and second guide assemblies being laterally spaced from each other with the yoke disposed substantially therebetween. When the flywheel is rotatively driven, the crank member is caused to translate linearly within the race thereby urging the yoke to slidingly engage the guide assemblies and move along the yoke axis to effect longitudinal reciprocating movement of the shaft and the mixing head.

In an additional feature, each of the first and second guide assemblies is a linear slide assemblies. In still another feature, each linear slide assembly includes a guide rail member associated with at least one corresponding guide rail following member. Each guide rail member is fixedly mounted to the housing coincident with one of the guide axes. Each of the at least one guide rail following members is rigidly connected to the yoke and slidably moveable relative to its corresponding guide rail member. Further still, each guide rail member has upper and lower, spaced-apart, guide rail following members associated therewith.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only, and are not intended as a definition of the limits of the invention. In the accompanying drawings.

DETAILED DESCRIPTION OF A PREFERRED EMBODIMENT

Figure 1:
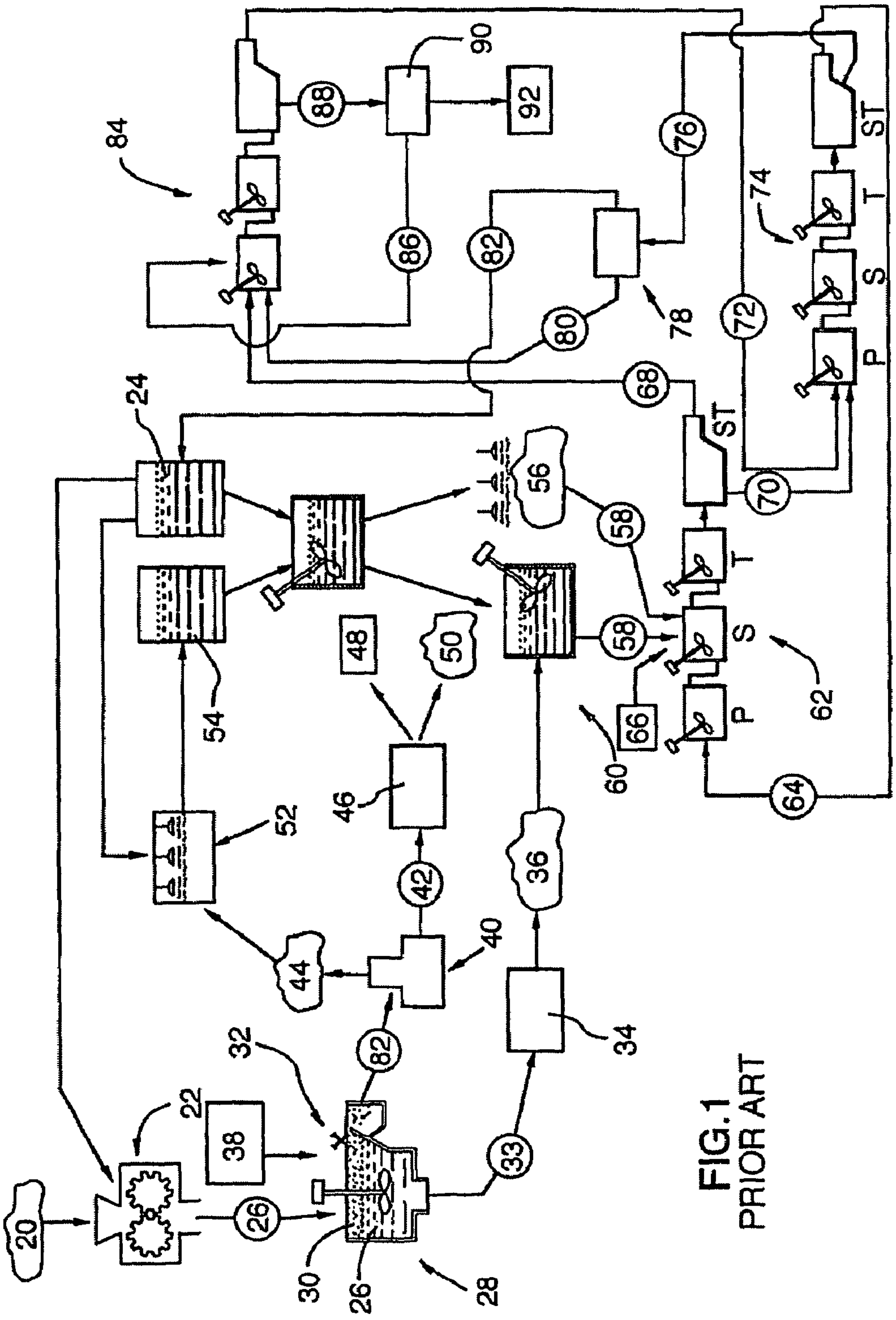
FIG.1 PRIOR ART
FIG. 1 is a diagrammatic representation of conventional SXEW processes for copper extraction.
Figure 2:
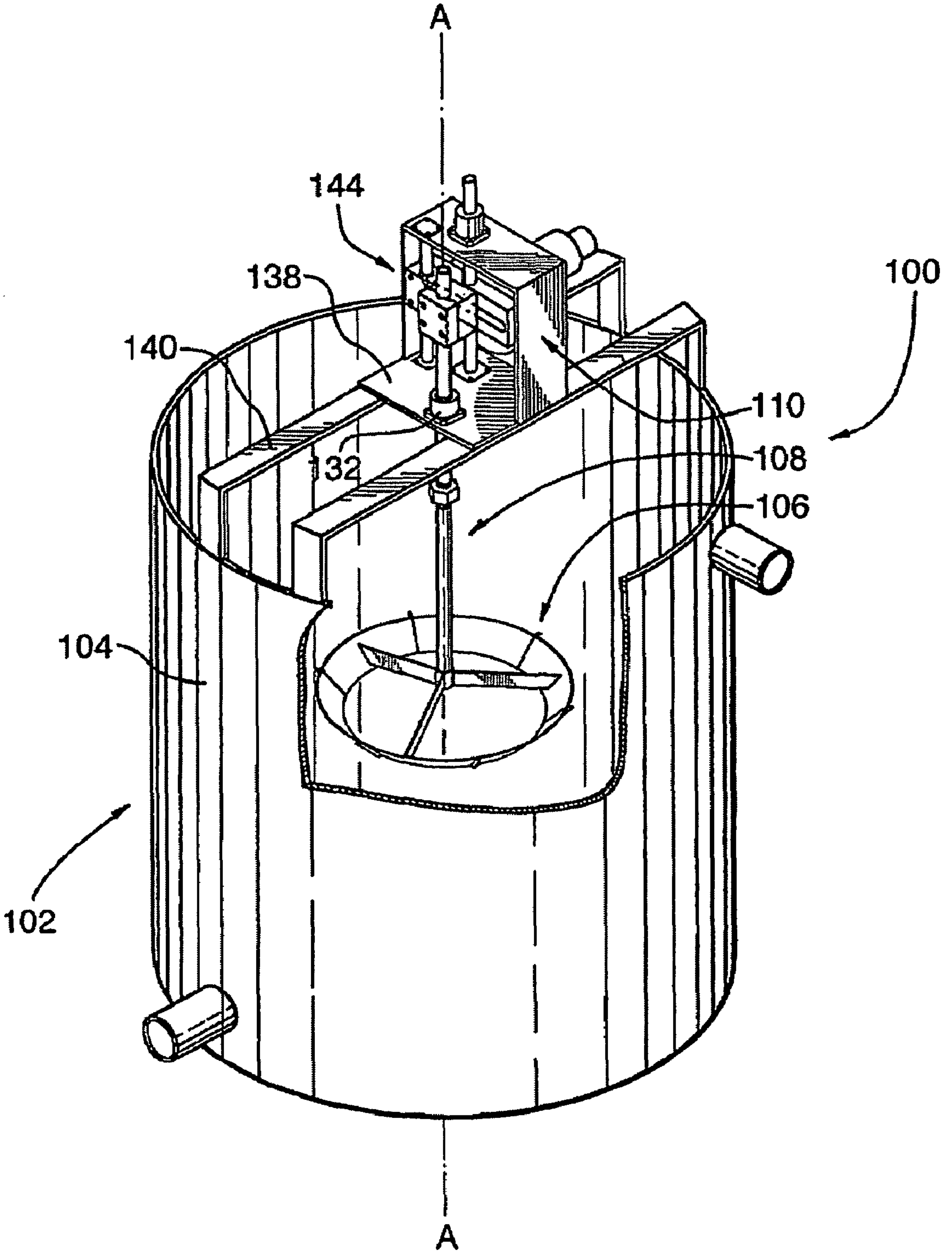
FIG. 2 is a front, top, right side perspective view of a fluid mixing apparatus according to a preferred embodiment of the present invention, shown operatively mounted on a vessel.

Referring now to FIG. 2 of the drawings, a fluid mixing apparatus, according to a preferred embodiment of the present invention and designated with general reference numeral 100, is shown in use with a fluid containing vessel 102 having a contiguous sidewall 104 centered about and defining a longitudinal axis A-A. The fluid mixing apparatus 100 is mounted to a frame 140 which spans over the vessel 102.

The fluid mixing apparatus 100 includes a mixing head 106 for immersion in the fluids to be mixed; means 108 for mounting the mixing head 106 within the vessel 102; and reciprocating means 110 for imparting reciprocating longitudinal (i.e. vertical) movement to the mixing head 106.

Figure 7:
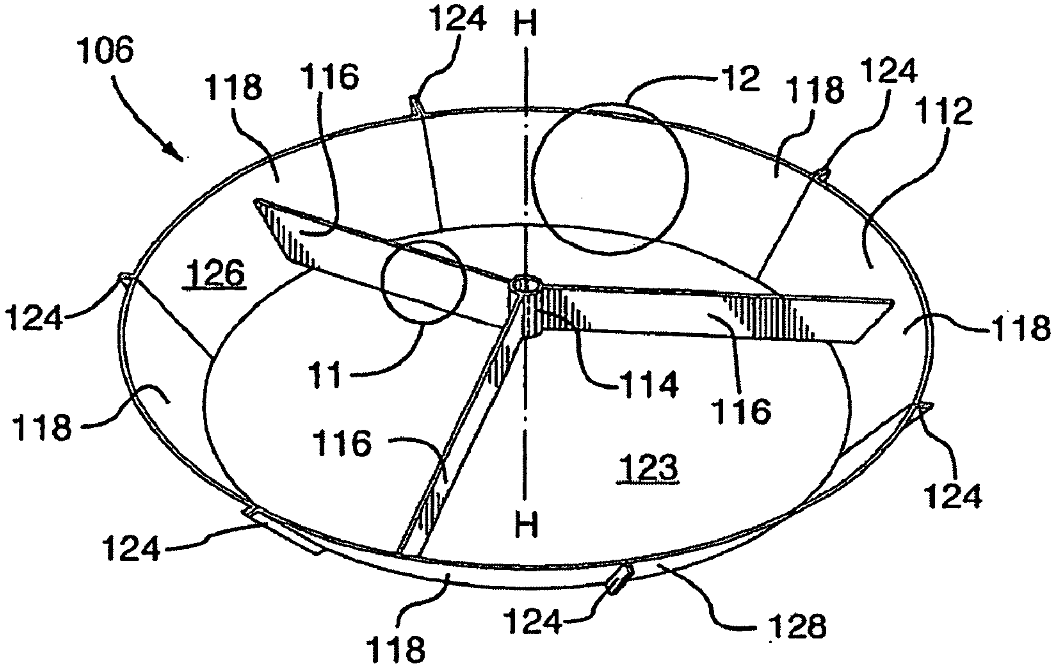
FIG. 7 is a front, top, right side perspective view of the mixing head of the fluid mixing apparatus shown in FIG. 2.

Referring to FIG. 7, the mixing head 106 includes: a blade body 112 formed about a head axis H-H; a generally tubular hub member 114; and a plurality of support webs 116 for connecting the blade body 112 to the hub member 114.

Figure 8:
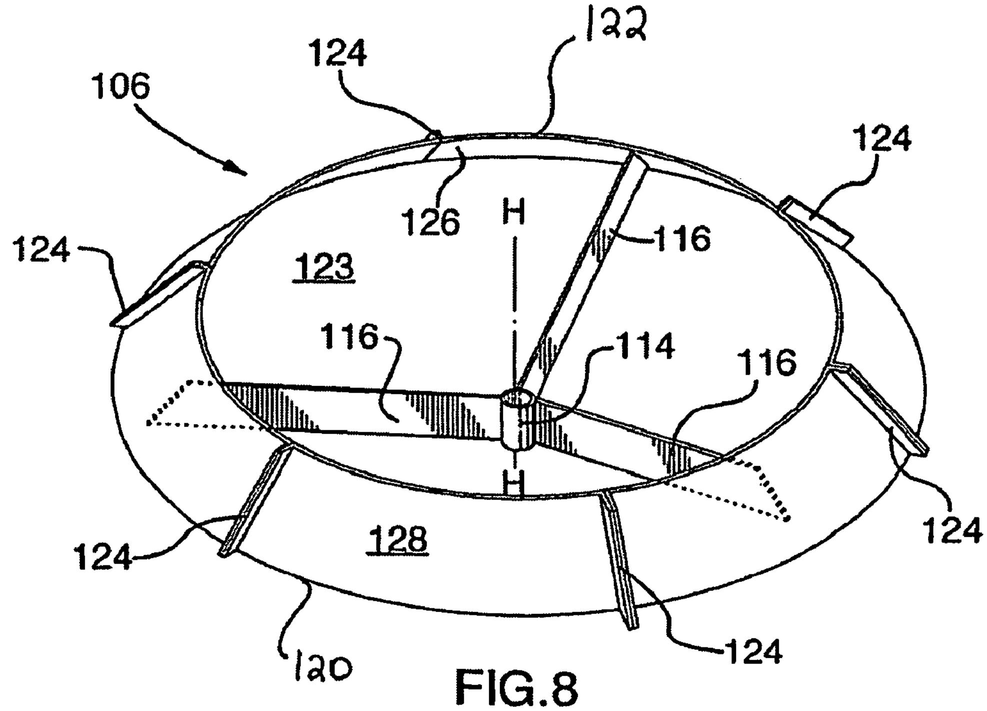
FIG. 8 is a rear, bottom, left side perspective view of the mixing head of the fluid mixing apparatus shown in FIG. 2.

As shown in FIG. 8, the blade body 112 has a first end 120, an opposed second end 122 disposed in spaced relation thereto along the head axis H-H, and a passageway 123 extending longitudinally between the first and second ends 120 and 122. In the preferred embodiment, the passageway 123 tapers uniformly from the first end 120 to the second end 122 to impart a substantially frustoconical shape to the blade body 112.

The blade body 112 also has an inner surface 126 and an outer surface 128. The outer surface 128 defines an inside blade diameter ID at the second end 122 of the blade body 112, and an outside blade diameter OD at the first end 120 thereof. The actual outside diameter OD may be between 25 and 40 percent of the internal diameter D of the vessel.

Figure 9:
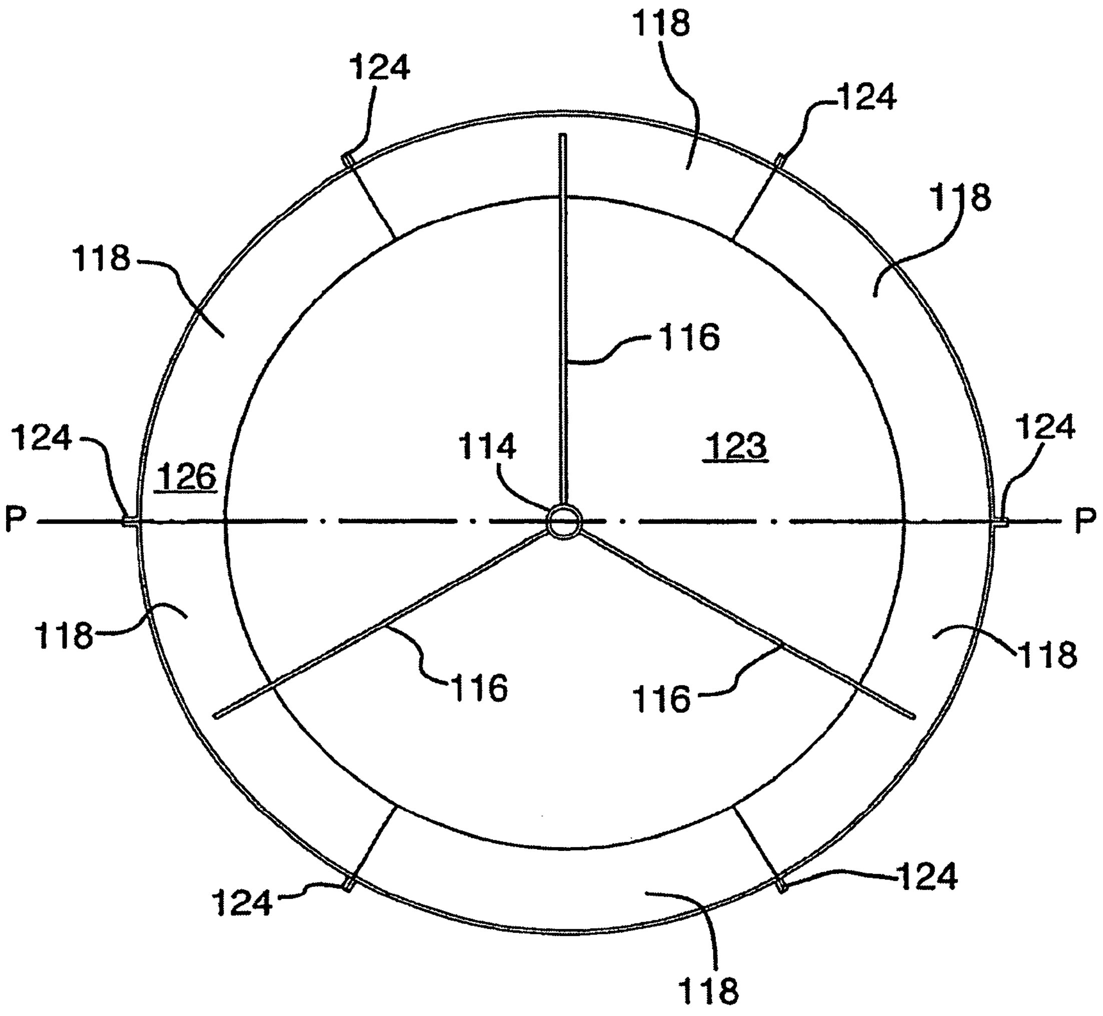
FIG. 9 is a bottom plan view of the mixing head of the fluid mixing apparatus shown in FIG. 2.
Figure 10:
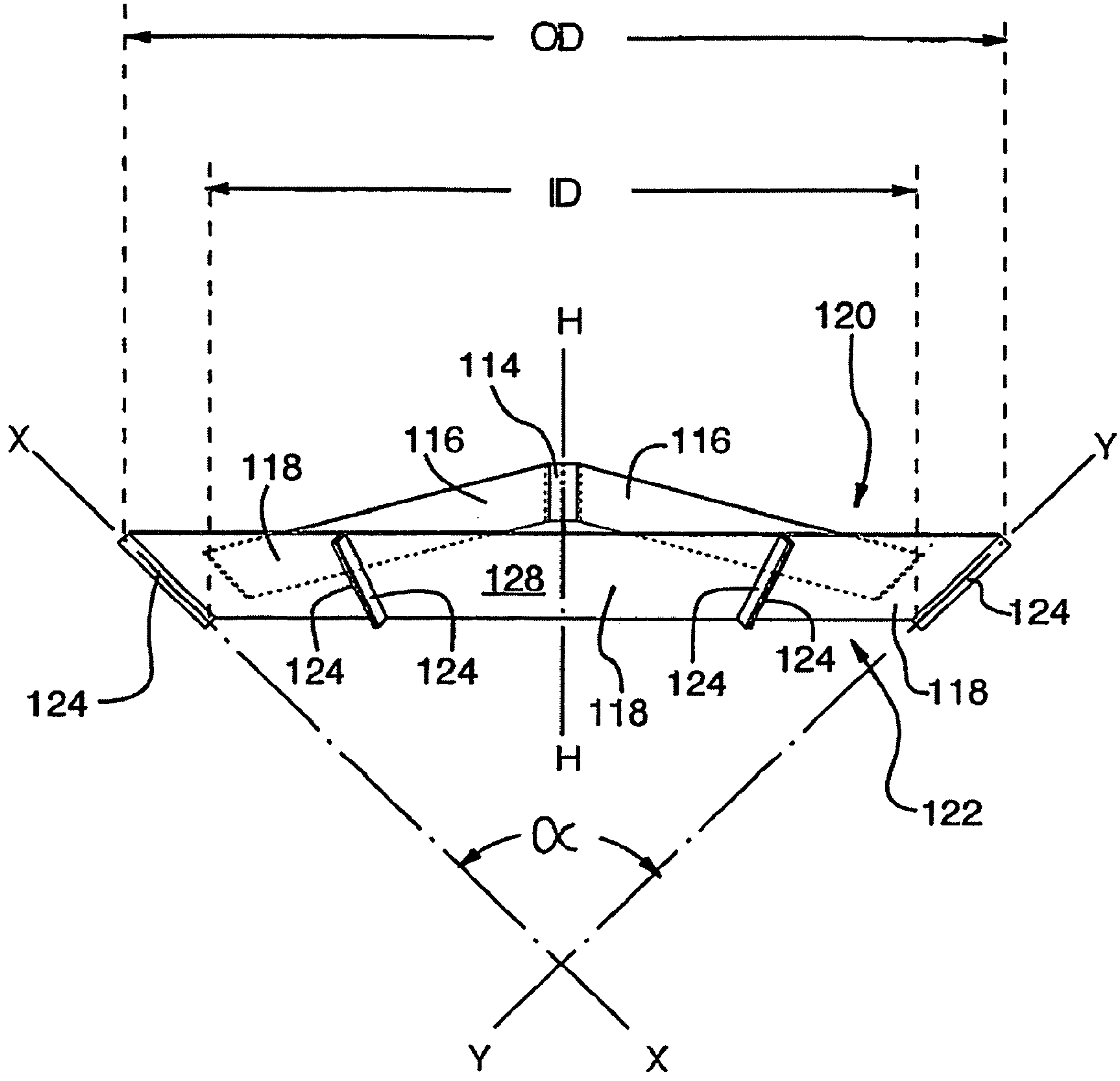
FIG. 10 is a right side elevational view of the mixing head of the fluid mixing apparatus shown in FIG. 2.

The taper in the passageway 123 can be expressed as an angle α, where angle α is the angle formed between a pair of axes X,X and Y,Y defined by, and coincident with, the intersections of the outer surface 128 of the blade body 112 and a plane P-P coincident with the head axis H-H, as shown in as indicated in FIGS. 9 and 10. The angle α is greater than or equal to 90° and less than 180°. Preferably, the angle α is between 90° and 120°.

Whereas in the preferred embodiment, the passageway 123 tapers uniformly along its length from the first end 120 to the second end 122 to define a substantially frustoconical blade body 112, the passageway may be configured to define other blade body shapes. For instance, the passageway can be configured to have different rates of taper therealong. In an alternate embodiment shown in FIGS. 16*a*, 16*b* and 16*c*, there is shown a mixing head 400 having a blade body 402. The blade body 402 includes a first end 404, a second end 406 and a passageway 408 defined therebetween. The passageway 408 tapers in a non-uniform fashion between the first end 404 and the second end 406. More specifically, the blade body 402 is formed with a point of inflection 410 therein located between the first end 404 and the second end 406. The passageway 408 tapers at first rate from the first end 404 to the point of inflection 410, and at a second rate from the point of inflection 410 to the second end 406. In the alternate embodiment shown, the first rate of taper is less than the second rate of taper. However, this need not be the case in all instances. In some applications, it may be desirable for the first rate of taper to be greater than the second rate of taper.

In the preferred embodiment, the blade body 112 is constructed from six arcuate segments 118 arranged end-to-end. The segments are secured to one another by bolts (not shown) fastened through flanges 124 provided at the ends of each segment 118 for this purpose (see FIGS. 7, 8 and 9).

The hub member 114 is disposed generally coincident with the head axis H-H. Extending substantially radially in a downwardly canted fashion from the hub member 114 is the plurality of support webs 116. The support webs 116 connect the arcuate segments 118 of the blade body 112 to the hub member 114. Such connection is effected by rivets or bolts (not shown).

Figure 12:
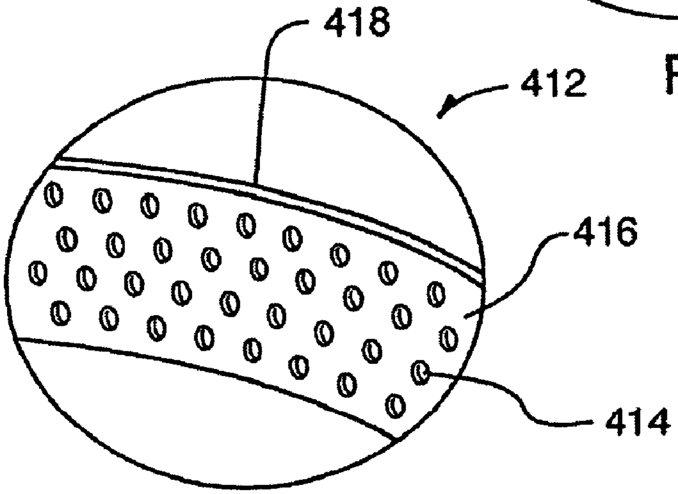
FIG. 12 is an enlarged detail view of an alternate embodiment of the blade body shown in FIG. 7, which view corresponds to the area circumscribed by circle 12 in FIG. 7.

Whereas in the preferred embodiment the blade body 112 and support webs 116 are substantially smooth, in an alternative embodiment, one or both of the blade body and the support webs could be formed with perforations or dimples. For instance, referring to FIG. 12, there is shown an alternate blade body 412 having formed therein a plurality of perforations 414 each extending between an inner surface 416 and an outer surface 418 thereof.

Figure 13:
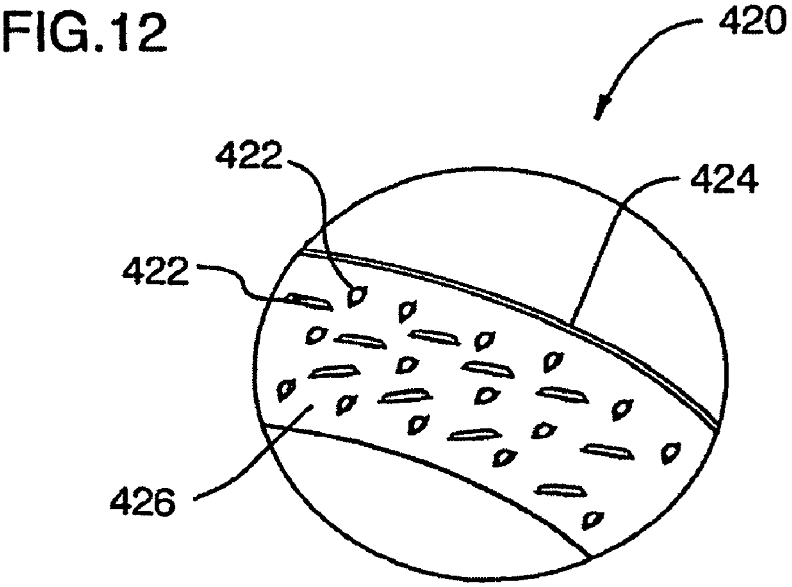
FIG. 13 is a view similar to that of FIG. 12, showing a further alternate embodiment of the blade body.

FIG. 13 shows a blade portion 420 provided with a plurality of dimples 422 projecting outwardly from an outer surface 424 of the blade portion 420 and inwardly from an inner surface 426 of the blade portion 420. This allows fine tuning of the mixing device in a manner not taught by the prior art.

Figure 11:
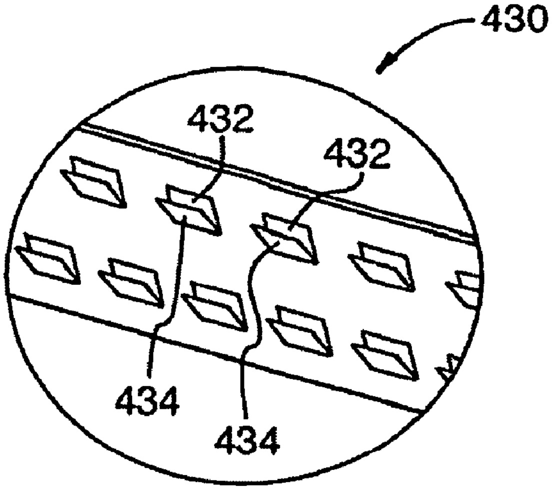
FIG. 11 is an enlarged detail view of an alternate embodiment of the support webs to that shown in FIG. 7, which view corresponds to the area circumscribed by circle 11 in FIG. 7.

In yet another alternate embodiment shown in FIG. 11, a support web 430 is provided with a plurality of perforations 432, as well as a plurality of tabs 434 each substantially overlying a respective perforation 432. The tabs 434 are connected to the support web 430 at one edge of said respective perforation 432 to form a gill. In this manner, the characteristics of the mixing currents produced by the blade body in motion can be finely tuned to control the droplet size of the dispersion, and hence, the mixing efficiency of the device, which feature is not available in prior art mixers.

Figure 3:
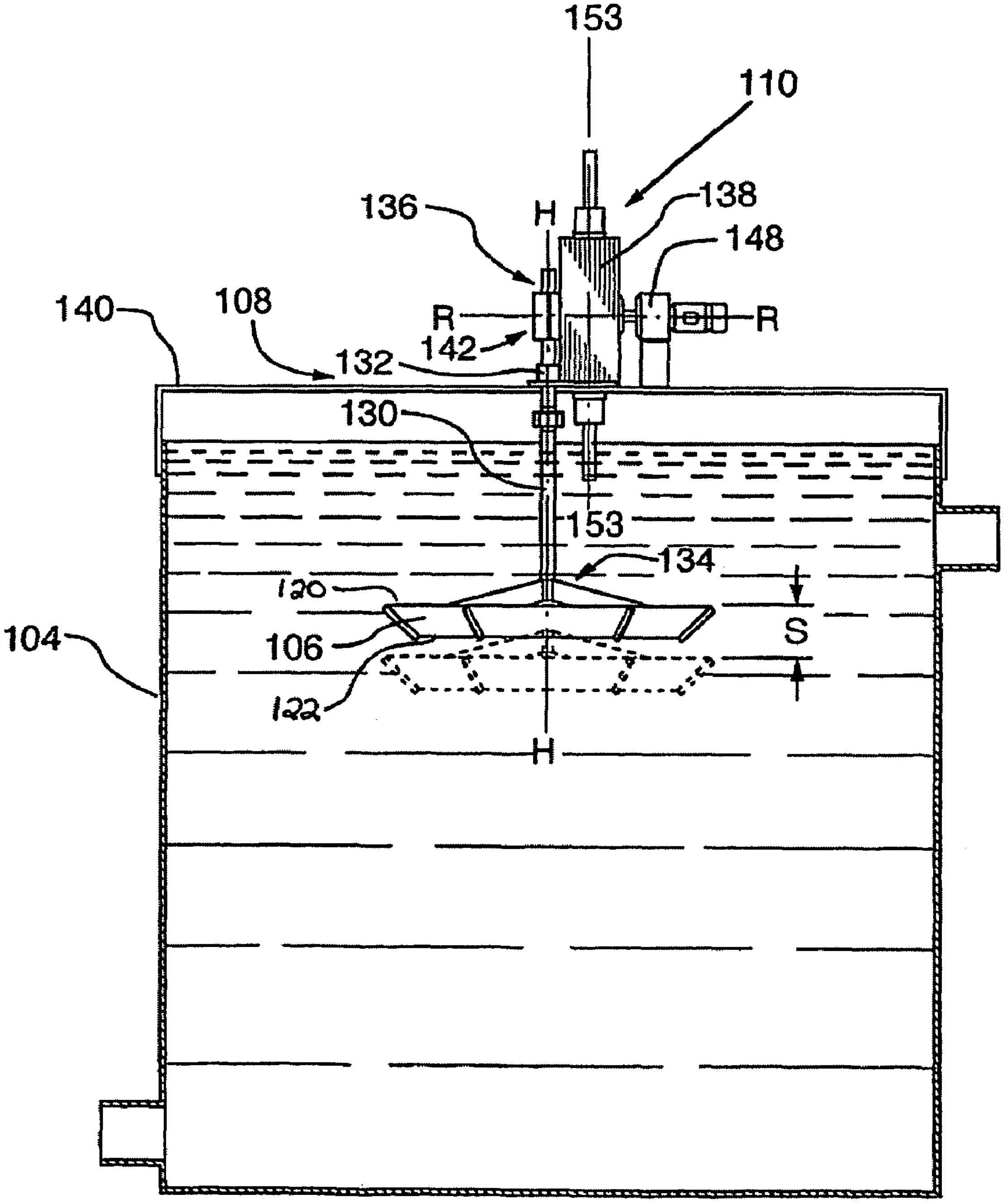
FIG. 3 is a right side cross-sectional view of the fluid mixing apparatus and vessel shown in FIG. 2.

Referring now to FIG. 3, the preferred mounting means 108 will be seen to include a mixer shaft 130 for carrying the mixing head 106 and a linear bearing 132 adapted to slidingly engage the mixer shaft 130.

The mixer shaft 130 has a bottom end 134 releasably mounted to the mixing head 106, and a top end 136 operatively connected to the reciprocating means 110. The releasable connection of the mixer shaft 130 to the mixing head 106 may be effected by threadingly engaging the bottom end 134 of the mixer shaft 130 with the threaded interior of the hub member 114. When mounted to the mixing head 106, the mixer shaft 130 extends substantially coincident with the head axis H-H.

In the preferred embodiment shown in FIGS. 2 and 3, the mixing head 106 is mounted to the mixer shaft 130 with the second end 122 of the blade body 112 being carried below the first end 120 thereof. In an alternate embodiment, the orientation of the mixing head could be reversed such that the first end of the blade body is carried below the second tube end thereof.

Figure 5:
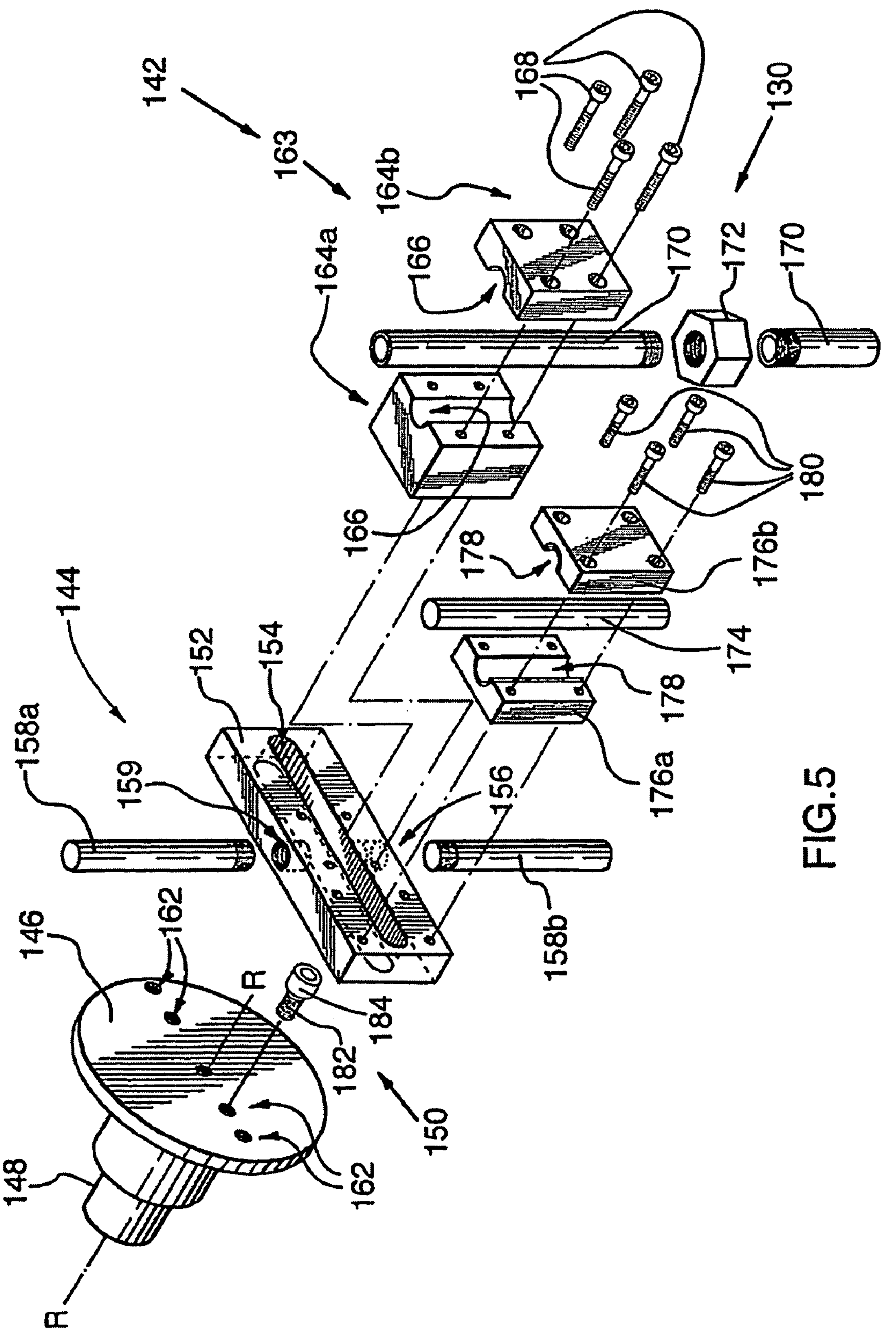
FIG. 5 is an exploded perspective view of a portion of the structure shown in FIG. 4.
Figure 6B:
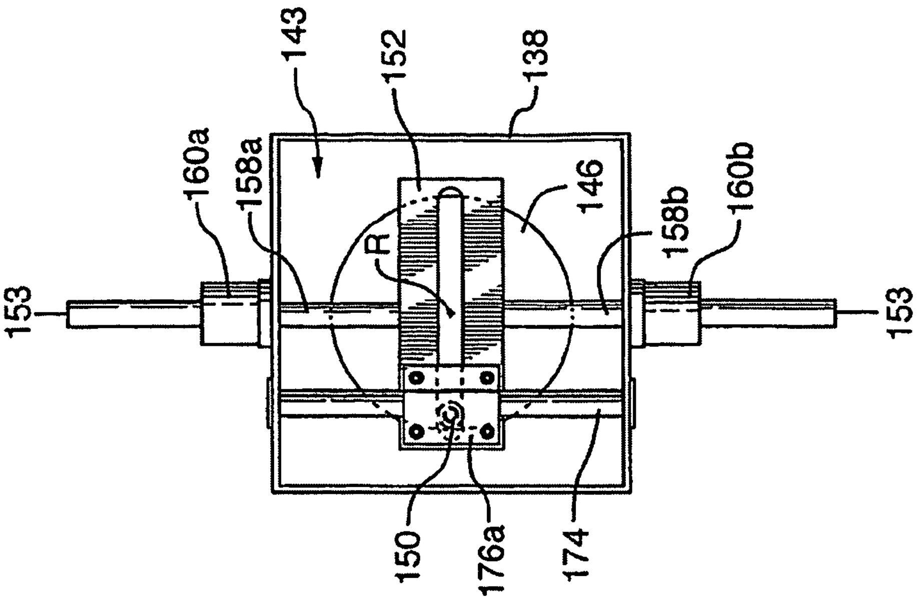
FIG. 6B is a view similar to FIG. 6A, with, inter alia, the flywheel displaced 90° counter-clockwise relative to its position in FIG. 6A.
Figure 6A:
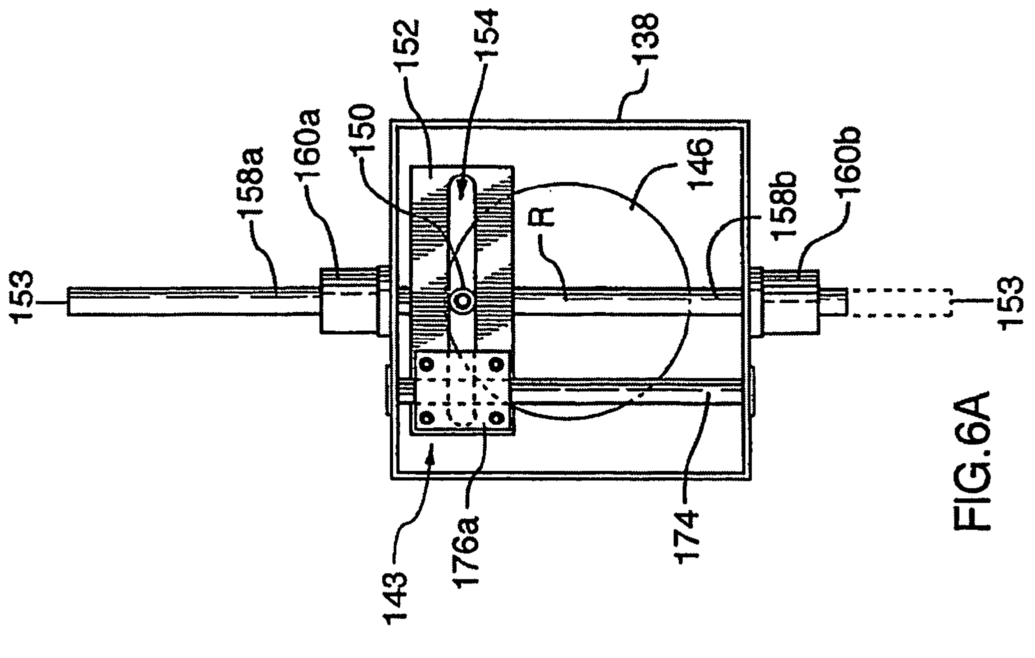
FIG. 6A is a front elevational view of the structure of FIG. 4, with the mixer shaft and shaft gripping means removed for clarity.
Figure 6D:
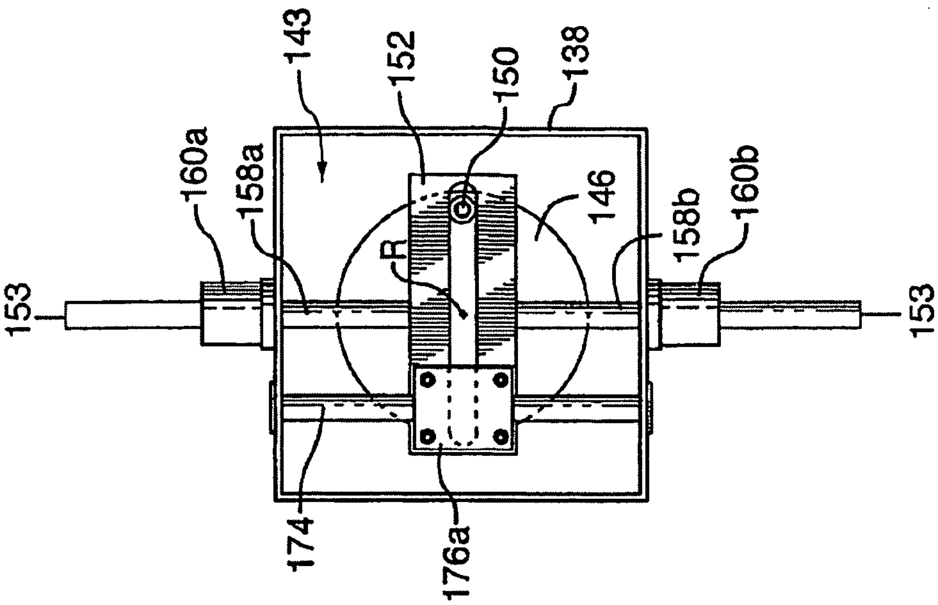
FIG. 6D is a view similar to FIG. 6A, with, inter alia, the flywheel displaced 90° counter-clockwise relative to its position in FIG. 6C.
Figure 6C:
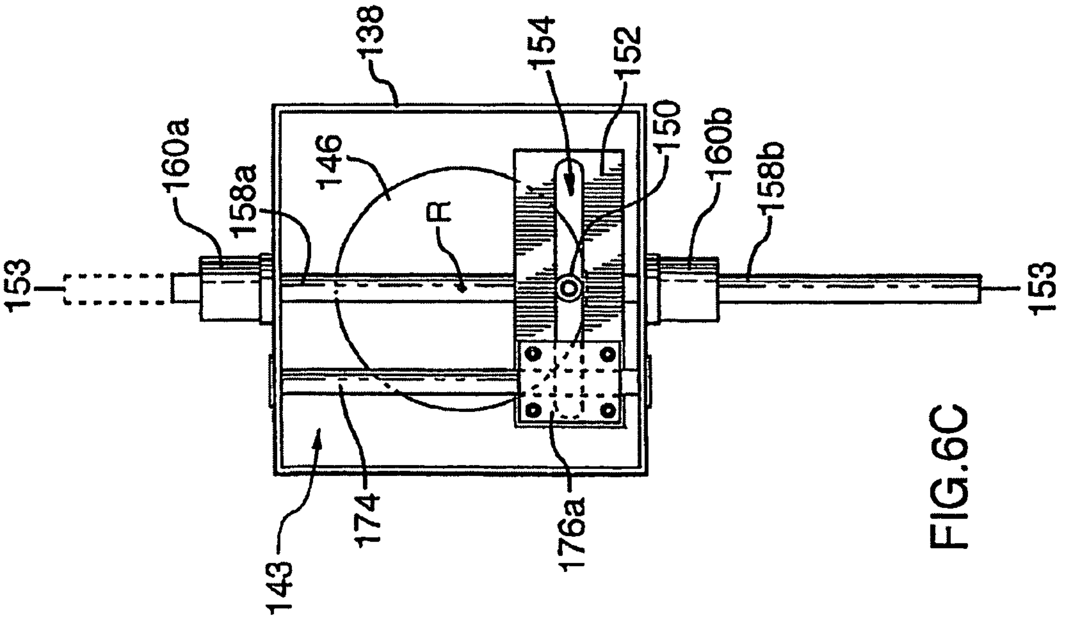
FIG. 6C is a view similar to FIG. 6A, with, inter alia, the flywheel displaced 90° counter-clockwise relative to its position in FIG. 6B.

As best shown in FIG. 5, the mixer shaft 130 is preferably hollow and is constructed of a plurality of tube segments 170, threaded at their ends and joined to one-another in end-to-end relation by threaded couplings 172, so that segments 170 can be added or removed as desired to accommodate for different depths of the vessel. The use of a hollow mixer shaft leads to reduced energy consumption by the fluid mixing apparatus during use. In contrast, conventional rotary-type mixers use heavy, solid shafts requiring greater energy input.

The linear bearing 132 is a sleeve-type bearing mounted in surrounding relation to the mixer shaft 130 for sliding engagement therewith during its reciprocating longitudinal movement. The linear bearing 132 is securely fixed to a housing 138 supporting the reciprocating means 110.

Figure 4:
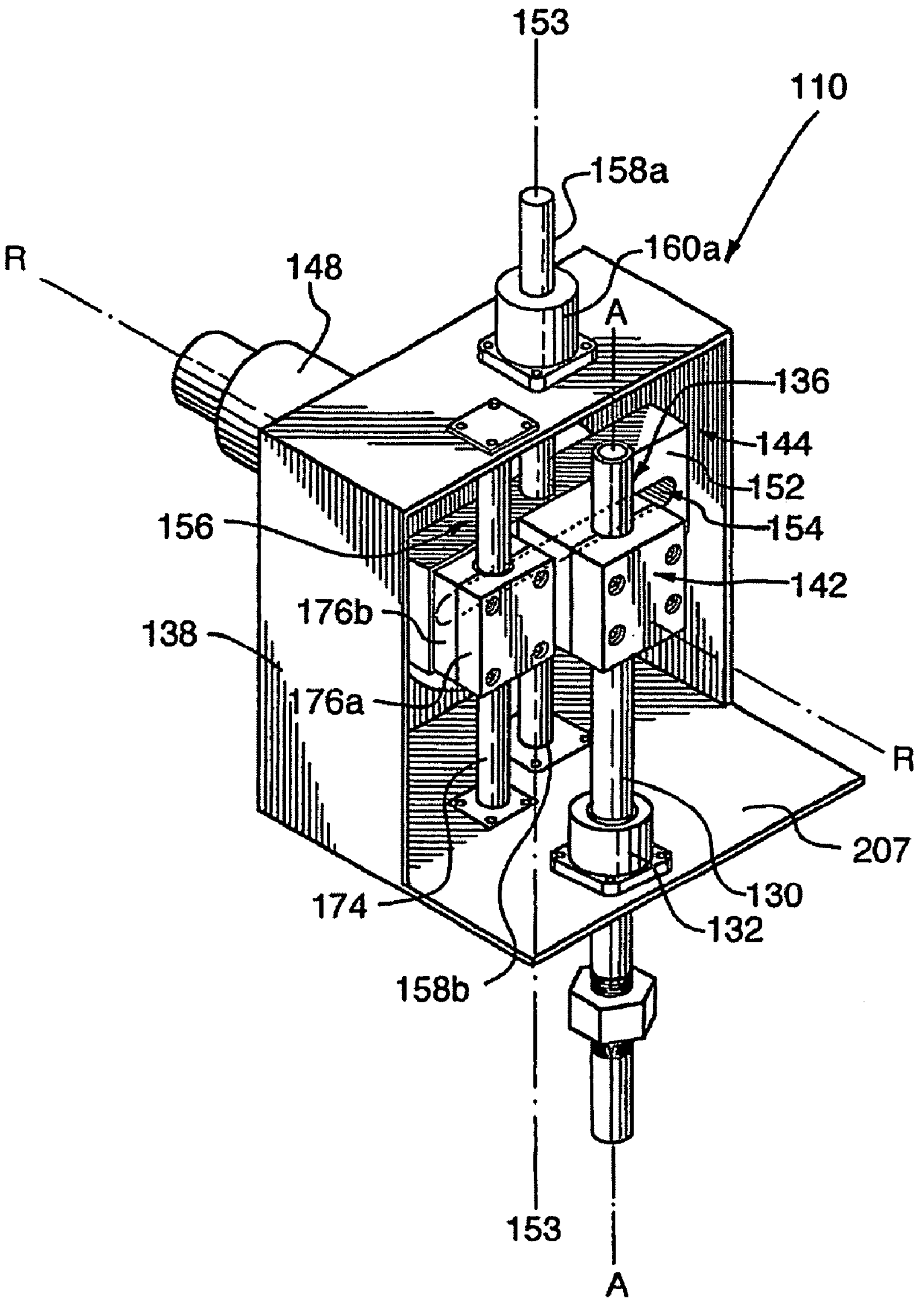
FIG. 4 is a front, top left side perspective view of the fluid mixing apparatus of FIG. 2, showing, inter alia, a reciprocating drive assembly and mounting means.

As best illustrated in FIG. 4, the reciprocating means 110 includes a shaft gripping means 142 for gripping the mixer shaft 130 adjacent its top end 136 and a reciprocating drive assembly 144 operatively connected to the mixing shaft 130 to impart reciprocating longitudinal movement to the mixing head 106.

With reference to FIGS. 4 and 5, the shaft gripping means 142 preferably includes a clamp 163 formed by a pair of mating clamping blocks 164*a* and 164*b*. Each clamping block 164*a*, 164*b* has a groove 166 formed therein which is sized and adapted for receiving the mixer shaft 130 in close fitting relation thereto. In the preferred embodiment, the groove 166 is generally concave and has a semi-circular cross-section. When the clamping blocks 164*a* and 164*b* are mated, the grooves 166 thereof are disposed in opposed relation to each other to grippingly receive the mixer shaft 130 and captively retain the mixer shaft 130 therebetween. Bolts 168 rigidly fasten the clamping blocks 164*a* and 164*b* to each other and to the reciprocating drive assembly 144. Thus fastened, the clamping blocks 164*a* and 164*b* transfer the reciprocating longitudinal movement of the reciprocating drive assembly 144 to the mixer shaft 130 when the fluid mixing apparatus 100 is in use.

This clamp arrangement permits the relative depth of the mixing head 106 in the vessel 102 to be conveniently adjusted from above; the clamp 163 need only be loosed, by disengaging the associated bolts 168, whereupon mixer shaft 130 can be raised or lowered as desired, and bolts 168 re-engaged.

As shown in FIGS. 4 and 5, the reciprocating drive assembly 144 includes: a flywheel 146; a drive 148 for driving rotation of the flywheel 146; a crank member 150 projecting from the flywheel; a yoke 152 adapted and configured to receive the crank member 150 therewithin; and guide means

156 for guiding the yoke 152 along a yoke axis 153 for reciprocating longitudinal movement. The flywheel 146, the drive 148, the crank member 150, the yoke 152 and the guide means 156 are operatively connected to, and co-operate with, each other to form a scotch yoke assembly 143.

The flywheel 146 is mounted to the housing 138 for rotation about a rotational axis R-R which is substantially normal to the longitudinal axis A-A. The drive 148 in the nature of an electric motor, is operatively connected by its drive shaft (not shown) to the flywheel 146 for driving rotation.

Projecting from the flywheel in a direction parallel to the rotational axis, is the crank member 150. The crank member 150 is removably attached to the flywheel 146 for rotation therewith. For the purpose of minimizing friction, the crank member 150 includes an inner axle portion 182 which is fixedly connected to the flywheel 146 and an outer roller portion 184 which is rotatably mounted by bearings (not shown) on the inner axle portion 182 (see FIG. 5).

The yoke 152 is mounted within the housing 138 for movement along a yoke axis 153 disposed substantially parallel to the longitudinal axis A-A. The yoke 152 is displaced from the flywheel 146 in the direction of the crank member 150 and has formed therein a substantially linear race 154 for receiving the crank member 150. The race 154 is disposed within the yoke 152, substantially normal to both the rotational axis R-R and the yoke axis 153. The race 154 is adapted and configured to allow translational movement of the crank member 150 relative to the yoke 152 as the flywheel 146 rotates.

The guide means 156 includes upper and lower threaded guide shafts 158*a* and 158*b* which are received in threaded, coaxial bores 156 disposed on upper and lower surfaces of the yoke 152. Corresponding upper and lower guide bearings 160*a* and 160*b* are provided on the housing 138 for slidingly engaging the upper and lower guide shafts 158*a* and 158*b*, respectively. During the reciprocating longitudinal movement, the upper guide shaft 158*a* extends protrudes through an aperture (not shown) formed in the housing about which the upper guide bearing 160*a* is mounted.

To counter stresses created on the yoke 152 by virtue of its carriage of the shaft gripping means 142, the guide means 156 additionally include a balancing or stabilizing shaft 174 and a pair of mating linear bearing blocks 176*a* and 176*b* fixed to the yoke for sliding engagement with the stabilizing shaft 174. The stabilizing shaft 174 is rigidly connected to the housing 138 and extends substantially parallel to yoke axis 153. Each linear bearing block 176*a* and 176*b* has a groove 178 of semi-circular cross-section formed therein which is sheathed with a self-lubricating material such as polytetrafluorethylene. When the linear bearing blocks 176*a* and 176*b* are mated, the grooves 178 thereof are mounted in opposed relation one with the other with the stabilizing shaft 174 extending longitudinally therebetween. Bolts 180 fasten the linear bearing blocks 176*a* and 176*b* to the yoke 152.

The workings of the reciprocating drive assembly 144 are now explained in greater detail below. With the yoke 152 operatively mounted with the upper and lower guide shafts 158*a* and 158*b* disposed within the guide bearings 160*a* and 160*b*, the yoke 152 is mounted to the housing 138 in a manner which constrains movement of yoke 152 otherwise than along the yoke axis 153 and normal to the rotational axis R-R. When the flywheel is rotatively driven by the drive 148, the crank member 150 is caused to translate linearly within the race 154 thereby urging the yoke 152 to move along the yoke axis 153 to effect longitudinal reciprocating movement of the mixer shaft 130, as indicated by the sequence of FIGS. 6A-6D. In the result, the mixing head 106 carried by the mixer shaft 130 is longitudinally displaced through a stroke length "S" with a duration "T" for each cycle (where "S" is expressed in inches and "T" is expressed in minutes). For the sake clarity, a cycle consists of the upstroke and downstroke movement of the mixing head 106. In FIG. 3, the mixing head 106 is shown in blackline in a starting position, and in phantom outline, at a position longitudinally displaced from the starting position through the stroke length "S".

The length of the resultant stroke may be selected by suitable adjustment to the radial position of the crank member 150 (that is, the distance between the crank member 150 and the rotation axis R-R). Accordingly, the flywheel 146 is provided with a plurality of threaded sockets 162 disposed in a radial array on the face of the flywheel 146 (see FIG. 5). Each threaded socket 162 is sized and adapted to receive the crank member 150 therein.

Each crank member and socket combination corresponds to a predetermined stroke length "S". The duration "T" of each cycle may be selected by suitable adjustment of the rotational speed of the drive 148.

By virtue of the reciprocating longitudinal movement imparted to the mixing head 106, a portion of the fluids in the vessel 102 is urged to flow through the passageway 123 defined in the blade body 112 thereby encouraging efficient mixing of the fluids in the vessel 102. It has been found that mixing efficiencies tend to be improved when the fluid mixing apparatus 100 is operated within a set of operational parameters defined by the equation:

$$80 \leqq 0.36 \times OD^2/ID^2 \times S/T \leqq 550,$$

where:

OD is the outside diameter of the blade body 112 at the first end 120 thereof measured in inches;

ID is the inside diameter of the blade body 112 at the second end 122 thereof measured in inches;

S is the stroke length measured in inches; and

T is the duration of each cycle measured in minutes.

While the stroke length "S" can measure between 2 inches and 24 inches, it is preferred that the stroke length "S" be between 4 inches and 16 inches. More preferably, the stroke length "S" is between 8 inches and 12 inches.

Moreover, while it has been found that improved mixing efficiencies may be obtained where the value for OD:ID is greater than 1.0 and less than or equal to 1.7, preferably, the value for OD:ID lies between 1.5 and 1.7.

When operated within the set of operational parameters defined above, it has been found that the present invention can be used to great advantage as a mixer for a vessel in a solvent extractor unit, as shown in FIGS. 2 and 3 and illustrated in Examples 1 and 2 below.

EXAMPLE 1

In the known application of the SXEW process previously described, samples were taken from the outfall of each of the primary vessel; secondary vessel; tertiary vessel and settling tank of a respective secondary extraction unit (A) and permitted to separate.

In a parallel secondary extraction unit (B) (ie processing a pregnant leachate of substantially identical composition), a mixing apparatus in accordance with the present invention (OD=60; ID=40; α=120; S=10; T=0.0333, driven by a 2 hp motor) was substituted for the rotary mixer in the secondary mixing vessel, and samples were again taken from the outfall from each of the primary, second and tertiary mixing vessels, and from the settling tank, and permitted to separate.

Copper concentration (g/l) was measured in the organic component of each sample, as follows:

| | (A) Cu (g/l) | (B) 30 cpm Cu (g/l) |
|---|---|---|
| Primary mixing vessel | 2.01 | 2.01 |
| Secondary mixing vessel | 2.06 | 2.06 |
| Tertiary mixing vessel | 2.12 | 2.13 |
| Settling tank | 2.14 | 2.13 |

As would be expected, copper concentration from the primary mixing vessel in each of the A and B lines is similar (because to that point in the process, mixing is provided by identical rotary mixers). However, unexpectedly, copper concentrations in the outfall from the secondary mixers also remained identical, and copper concentration in the outfall from the settling tanks remained quite similar, despite the almost 70% reduction in energy input (1.25 hp drawn from a 2 hp drive motor for the reciprocating mixer, as compared to 5.0 hp drawn from the 7.5 hp motor drive for the rotary mixer).

EXAMPLE 2

In a second test, the B line of Example 1 was modified by altering the motor speed of the mixer of the present invention, such that it operated at 45 cycles/minute (T=0.0222).

Copper concentration (g/l) was again measured, as follows:

| | (B) [45 cpm] Cu (g/l) |
|---|---|
| Primary mixing vessel | 2.00 |
| Secondary mixing vessel | 2.08 |
| Tertiary mixing vessel | 2.11 |
| Settling tank | 2.16 |

Again, as would be expected copper concentration from the primary mixing vessel in the B line remained similar to that obtained in the A line (because to that point in the process, mixing is provided by identical rotary mixers). However, unexpectedly, copper concentrations in the outfall from the settling tank from the modified B line showed significant improvement over the A line results (copper recovery improved from 2.14 g/l to 2.16 g/l).

Without intending to be bound by theory, it is believed the fluid mixing apparatus of the present invention provides mixing currents which [at least in the context of the liquids utilized in SXEW copper extraction] create a dispersion characterized by consistent-sized droplets, uniformly distributed throughout the mixing vessel, whereas in a rotary mixer, there is a wide variation in drop sizes, and in the distribution of said drops, (perhaps due to the fact that the blade in a rotary mixer moves at different speeds along its length). This uniform dispersion is believed to provide an environment amenable to efficient mass transfer between phases, while at the same time providing for substantial disengagement of the mixed phases within a relatively short time frame.

Whereas the illustrations depict an embodiment of the present invention which is preferred, various modifications are contemplated and described below.

In the preferred embodiment, the shaft gripping means 142 is adapted to allow the clamping blocks 164*a* and 164*b* to be uncoupled from each other and detached from the yoke 152 by merely removing the bolts 168. It will be appreciated, however, that in some instances it may not be desirable to completely detach the clamp from the yoke when releasing the mixer shaft. In such instances, it would be preferable to uncouple the clamping blocks while still maintaining a rigid connection between one of the clamping blocks and the yoke. In the alternate embodiment shown in FIGS. 17 and 18, this is achieved by replacing clamp 163 with a modified clamp 186. While the clamp 186 is generally similar to the clamp 163 in that it has a pair of mating clamping blocks 188*a* and 188*b* formed with concave grooves 190 therein, it differs in one material respect, that is, the clamping block 188*a* is fastened to the yoke 152 by bolts 192, independently of clamping block 186. Mating of the clamping blocks 188*a* and 188*b* is achieved by fastening bolts 194.

Figure 17:
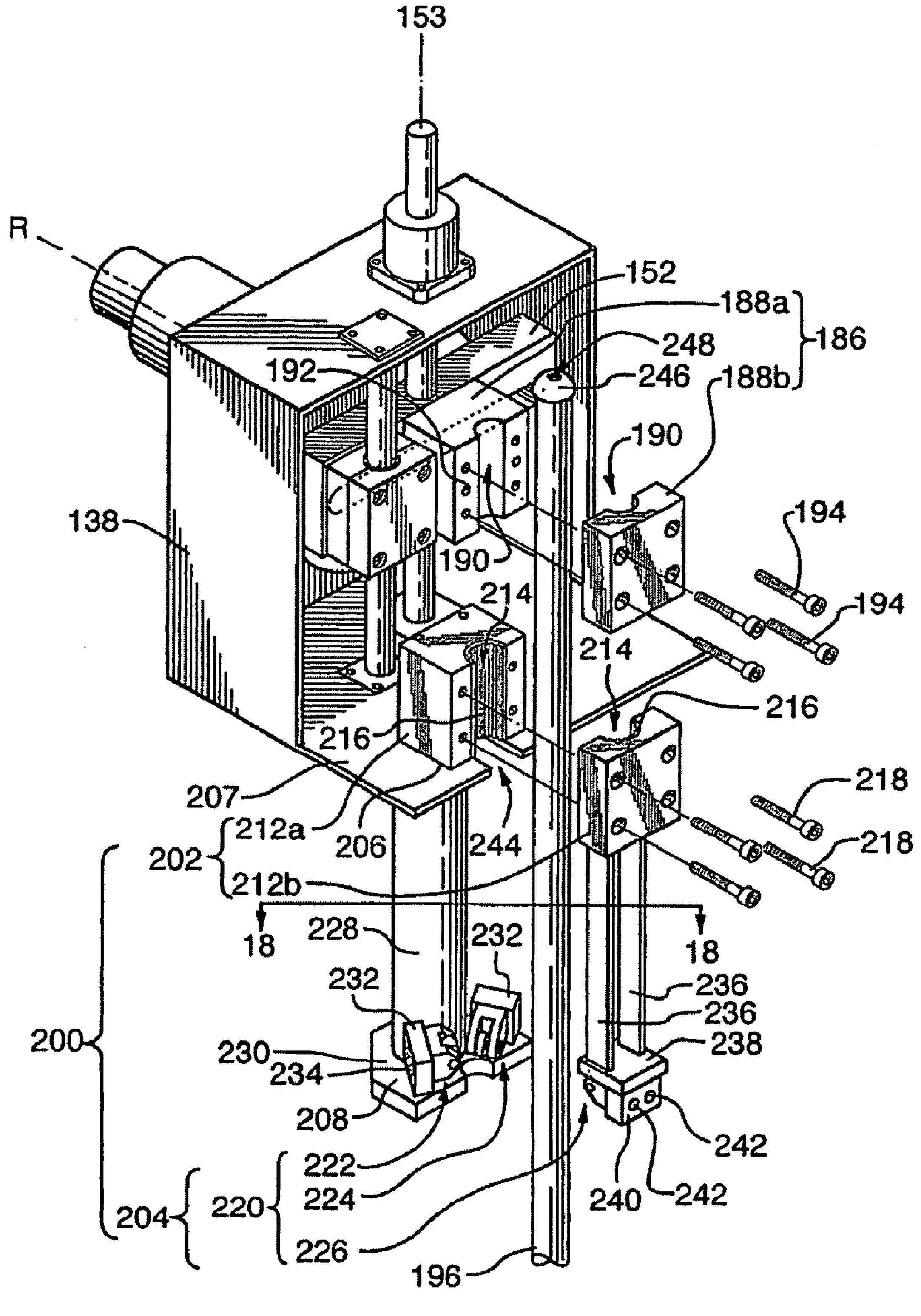
FIG. 17 is a partially exploded view showing an alternate mounting means and an alternate shaft gripping means to those shown in FIG. 4.
Figure 18:
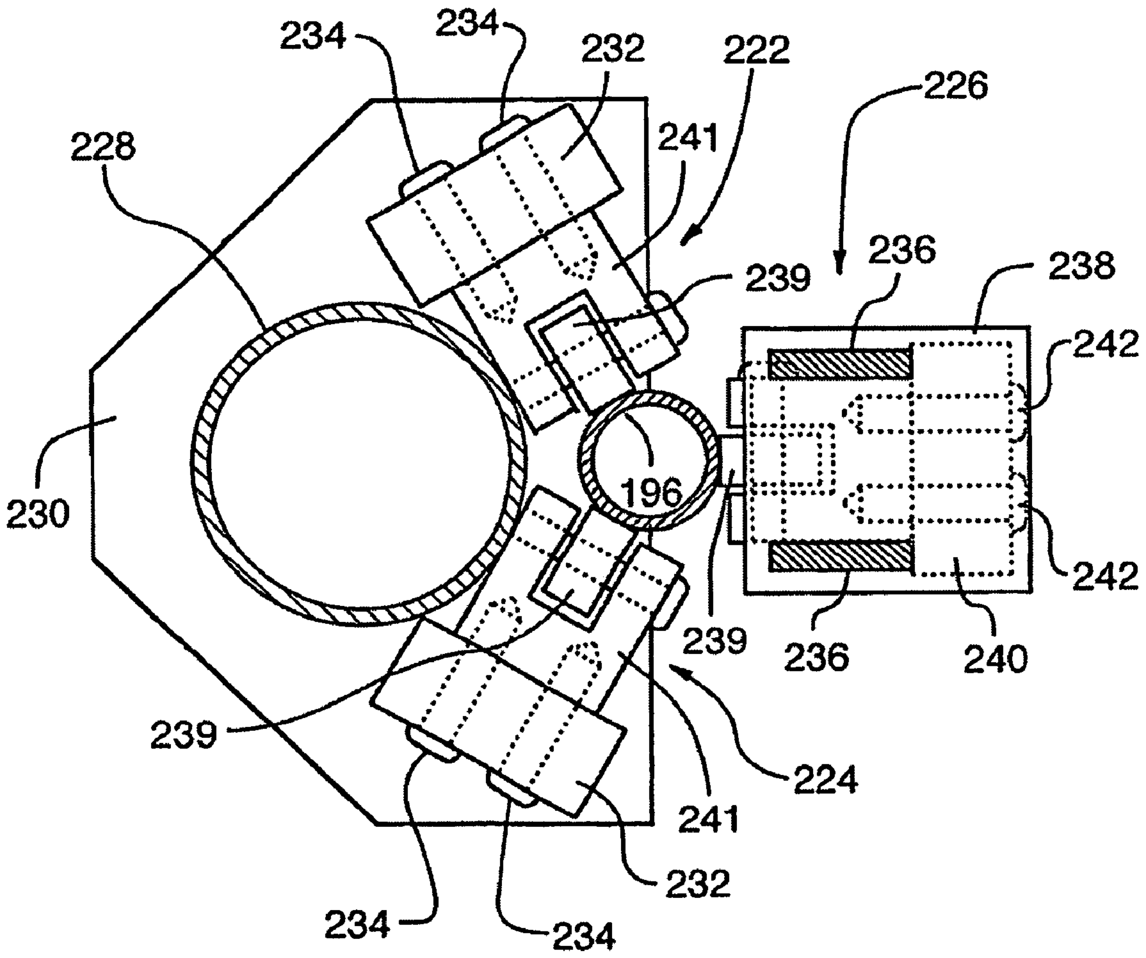
FIG. 18 is a sectional view, along sight line 18-18 of FIG. 17, with the apparatus shown fully assembled.

While in the preferred embodiment the mounting means 108 includes a single linear bearing 132 which slidingly engages the mixer shaft 130 at a single location, in an alternate embodiment a linear bearing assembly could be provided for sliding engagement with the mixer shaft at more than one location. One such alternate embodiment is shown in FIGS. 17 and 18, where a mixer shaft designated with reference numeral 196 and a linear bearing assembly is designated with reference numeral 200. The linear bearing assembly 200 includes an upper bearing subassembly 202 and a lower bearing subassembly 204 for engagement with the mixer shaft 196 at respective upper and lower, longitudinally spaced, locations 206 and 208, respectively.

The upper bearing subassembly 202 is adapted and configured for sliding engagement with the mixer shaft 196. More specifically, it has a bushing 210 formed of mating bushing blocks 212*a* and 212*b* disposed in surrounding relation to the mixer shaft 196. Each bushing block 212*a*, 212*b* has a concave groove 214 of semi-circular cross-section formed therein for receiving the mixer shaft 196. Each groove 214 is sheathed or lined with an arcuate pad 216 of self-lubricating material such as polytetrafluorethylene. Preferably, each pad 216 is ribbed. When the bushing blocks 212*a* and 212*b* are mated, the grooves 214 thereof are mounted in opposed relation one with the other with the mixer shaft 196 extending longitudinally therebetween. The bushing blocks 212*a* and 212*b* are securely attached to each other by bolts 218. The bushing 210 is operatively connected to the housing 138 by securely mounting bushing block 212*a* to a base 207 of the housing 138.

The lower bearing subassembly 204 is adapted and configured for rolling engagement with the mixer shaft 196. The lower bearing subassembly 204 includes at least two roller assemblies identified generally as 220, carried below the base 207 of the housing 138 at the lower location 208. However, preferably, the lower bearing subassembly 204 has first, second and third roller assemblies respectively, 222, 224 and 226, mounted in surrounding relation to the mixer shaft 196. A first mounting member in the nature of tubular support 228 attaches the first and second roller assemblies 222 and 224 to the base 207 of the housing 138. The tubular support 228 depends downwardly from the base 207 and terminates at its distal end with a flange member 230. The flange member 230 has a pair of upstanding brackets 232 to which are fastened the first and second roller assemblies 222 and 224 by bolts 234.

The lower bearing subassembly 204 also includes a second mounting member in the nature of a pair of removable supports 236. The removable supports 236 are securely attached to the bushing block 212*a* and depend downwardly therefrom to a terminus 238. The terminus has a bracket 240 which extends downwardly therefrom. The third roller assembly is secured to the bracket 240 by bolts 242.

In the preferred embodiment, each roller assembly 222, 224 and 226 includes a single roller 239 rotatively mounted to a roller housing 241. It will be appreciated that in alternate embodiments multiple rollers may be employed.

When the bushing blocks 212*a* and 212*b* are operably secured to each other, the first, second and third roller assemblies 222, 224 and 226 circumferentially surround the mixer shaft 196, as shown in FIG. 18, at a position beneath and longitudinally spaced from bushing 210. The support provided by the first, second and third roller assemblies 222, 224 and 226 at the lower location 208 tends to limit flexure of the mixer shaft 196, while permitting reciprocating longitudinal movement thereof.

As best shown in FIG. 17, the mixer shaft 196 can be removed from the housing 138 for servicing, maintenance, repair or replacement by first disassembling the upper bearing subassembly 202 and then by disengaging the clamp 186. The removal of bolts 218 in bushing 210 allows the bushing block 212*b* and the third roller assembly 226 attached thereto, to be removed from sliding engagement with the mixer shaft 196. Bolts 194 can then be removed from clamp 186 thereby releasing the mixer shaft 196. An open-ended rebate or slot 244 formed along an outermost edge of the base 207 permits the mixer shaft 196 to be displaced laterally from the base for ease of removal. To further facilitate handling of the mixer shaft 196 once released, the mixer shaft 196 is formed with an upper enlarged end portion 246, in which is provided a threaded bore 248, to receive a threaded lifting lug (not shown).

Figure 19:
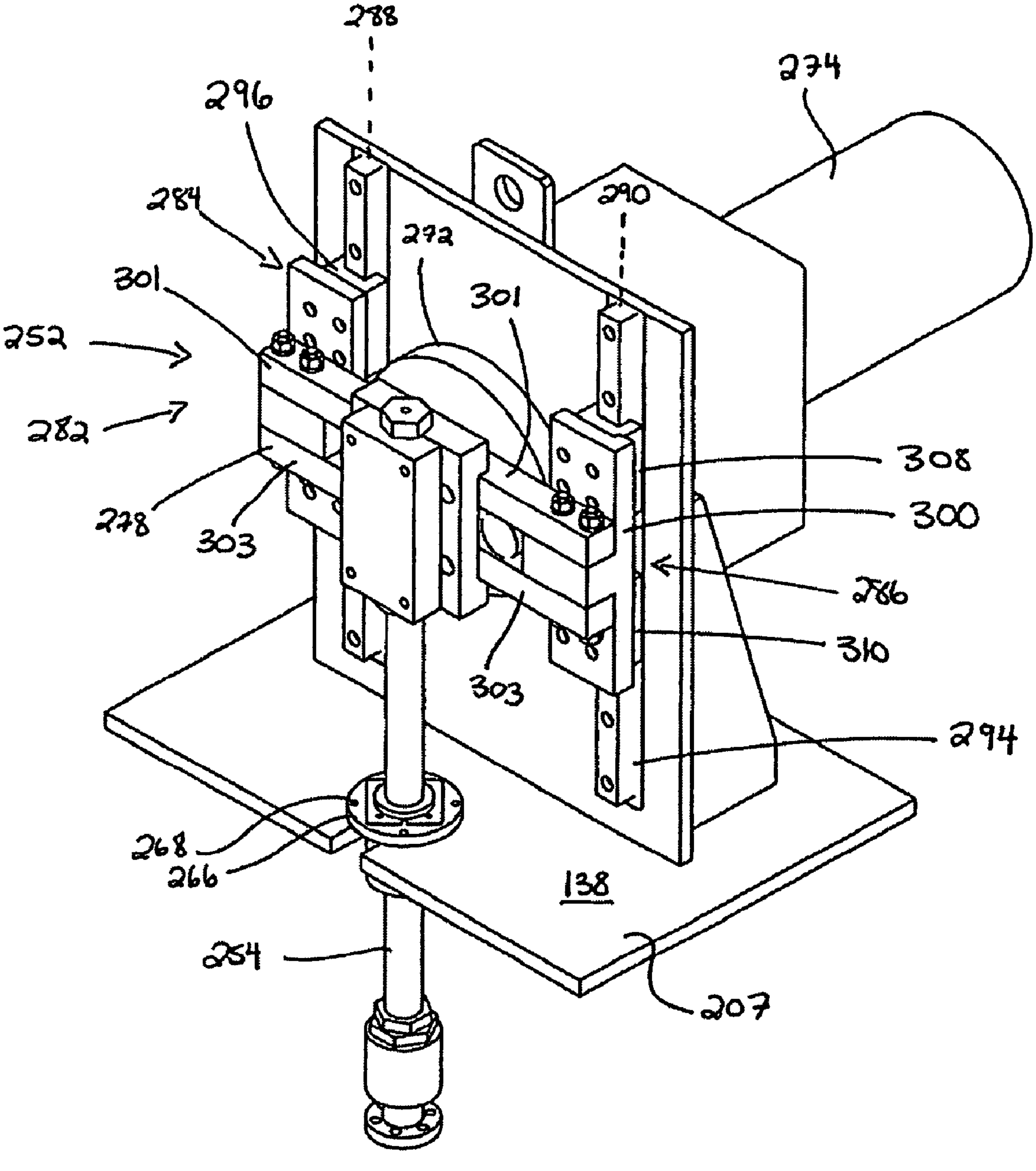
FIG. 19 is a perspective view of yet another alternate mounting means and an alternate reciprocating drive assembly to those shown in FIG. 4.
Figure 20:
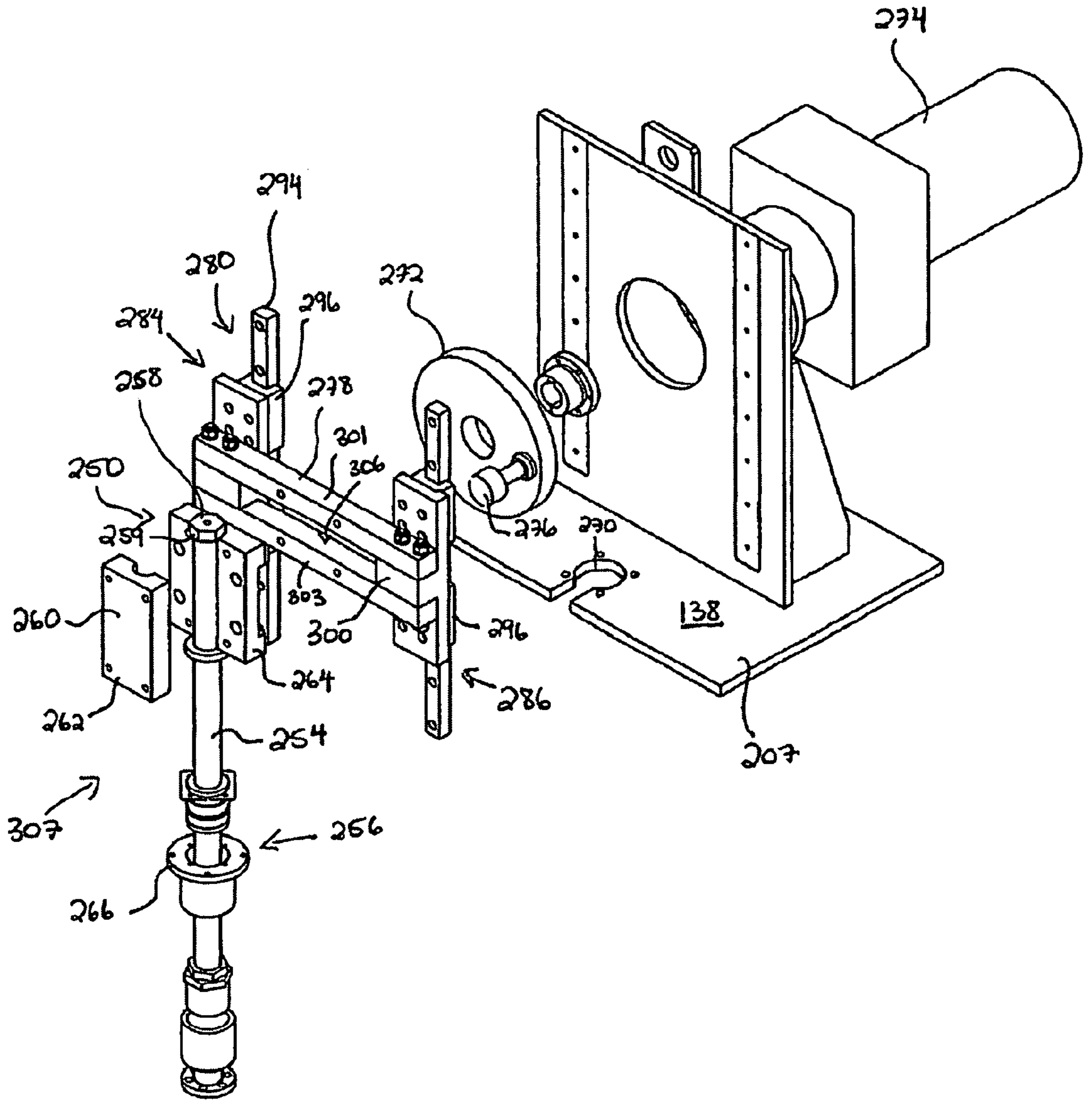
FIG. 20 is a partially exploded perspective view of the mounting means and the reciprocating drive assembly of FIG. 19.

With reference to FIGS. 19 and 20, there is shown an alternate mounting means 250 and an alternate reciprocating drive assembly 252. The mounting means 250 generally resembles the mounting 108 in that it includes a mixer shaft 254 and a linear bearing 256. The mixer shaft 254 is generally similar to mixer shaft 130, but differs in that it has an enlarged shaft head 258 provided with a support flange 259. When operatively connected to the shaft gripping clamp 260, the support flange 259 of the mixer shaft 254 abuts clamping blocks 262 and 264 thereby providing an additional mechanical connection to the frictional connection effected by the clamping blocks 262 and 264.

The linear bearing assembly 256 includes a sleeve-type linear plain bearing 266 mounted in surrounding relation to the mixer shaft 254. The plain bearing 266 is secured to the base 207 of the housing 138 by fasteners 268. A keyhole-shaped slot 270 formed along an outermost edge of the base 207 permits the mixer shaft 254 to be displaced laterally from the base 207 during removal thereof. By virtue of the use of the plain bearing 266, it will however be evident that, in order to remove the mixer shaft 244, the plain bearing 266 must first be detached from the housing 138, by removing fasteners 268.

The reciprocating drive assembly 252 is generally similar to the reciprocating drive assembly 144 described above in that it has a flywheel 272, a drive 274, a crank member 276, a yoke 278 and guide means 280 operatively connected to form a scotch yoke assembly 282. However, whereas guide means 156.*of* reciprocating drive assembly 144 includes upper and lower guide shafts 158*a* and 158*b*, corresponding upper and lower guide bearings 160*a* and 160*b* and a single stabilizing shaft 174 with mating linear bearing blocks 176*a* and 176*b*, the guide means 280 employs a pair of parallel left and right guide assemblies in the nature of first and second linear slide assemblies 284 and 286. The first and second linear slide assemblies 284 and 286 are operatively connected to the housing 138 and to the yoke 278 for sliding engagement therewith along a pair of guide axes 288 and 290 extending substantially parallel to a yoke axis designated as 292. The first and second linear slide assemblies 284 and 286 are laterally spaced from each other with the yoke 278 substantially disposed therebetween.

Each linear slide assembly 284, 286 includes a guide rail member in the nature of a track 294 associated with at least one corresponding guide rail following member in the nature of a saddle member 296. Each track 294 is fixedly secured to a support member 298 of the housing 138 coincident with a respective guide axis 288 or 290, as the case may be. Each saddle member 296 is adapted and configured for sliding motion along its corresponding track 294.

The linear slide assemblies 284 and 286 are additionally provided with saddle mounting members 300 for attaching the saddle members 296 to the yoke 278. The saddle mounting members 300 are generally T-shaped members mounted between a pair of transverse yoke beams 301 and 303 to define a race 306 formed in the yoke 278. The saddle members 296 are in turn mounted to the back of the saddle mounting members 300 in opposed relation to the track 294. Thus attached, the saddle members 296 bound on either side the race 306. Looking into the direction of arrow 307 (shown in FIG. 19), it can be seen that the linear bearing assemblies 284 and 286 are located aft of the yoke 278.

In the alternate embodiment shown and described above, each linear slide assembly 284, 286 is provided with two, longitudinally-spaced, saddle members 296 for improved stability; an upper saddle member 308 and a lower saddle member 310.

Figure 21:
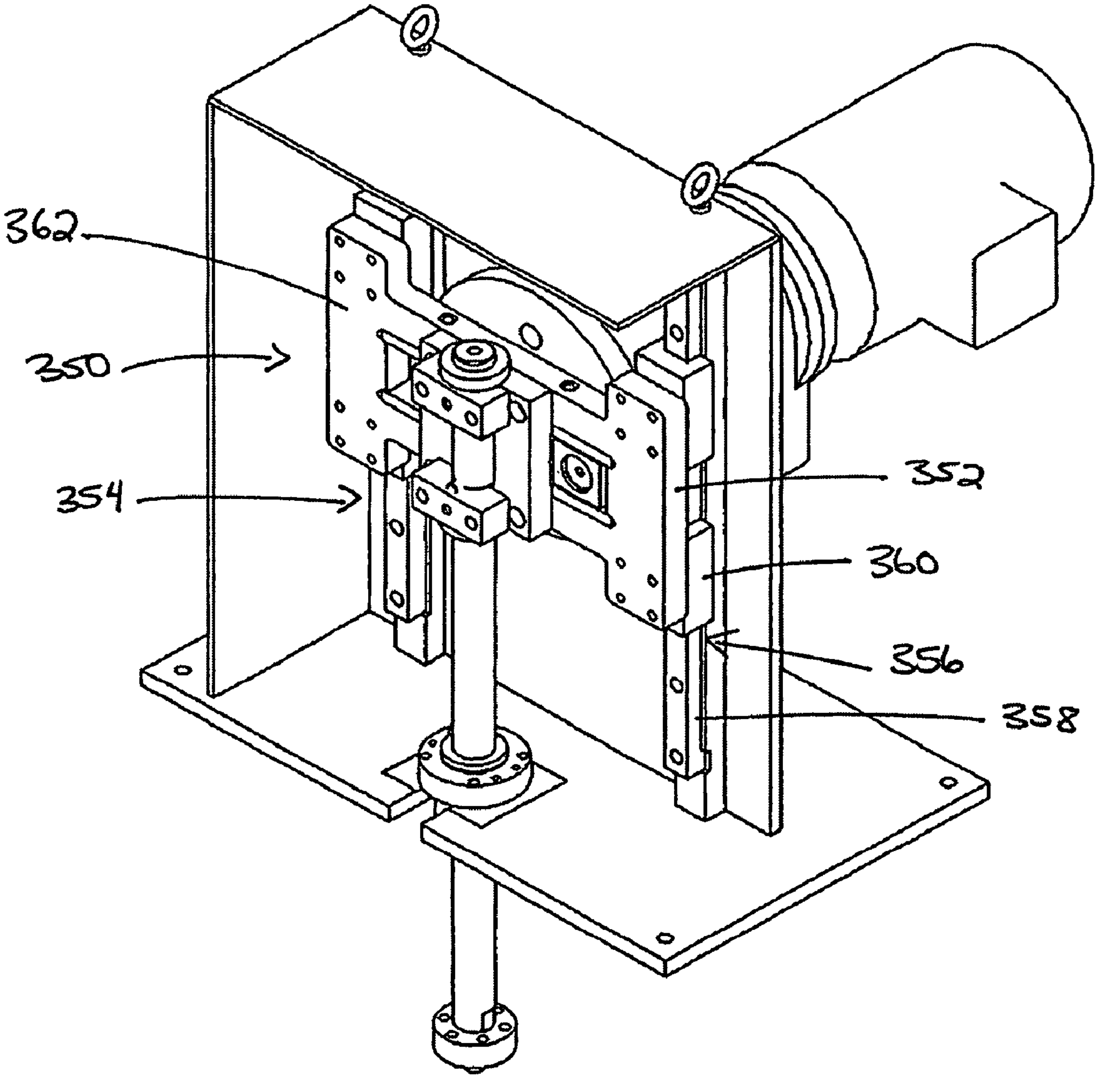
FIG. 21 is a top, right perspective view of an alternate reciprocating drive assembly to that shown in FIG. 19.
Figure 22:
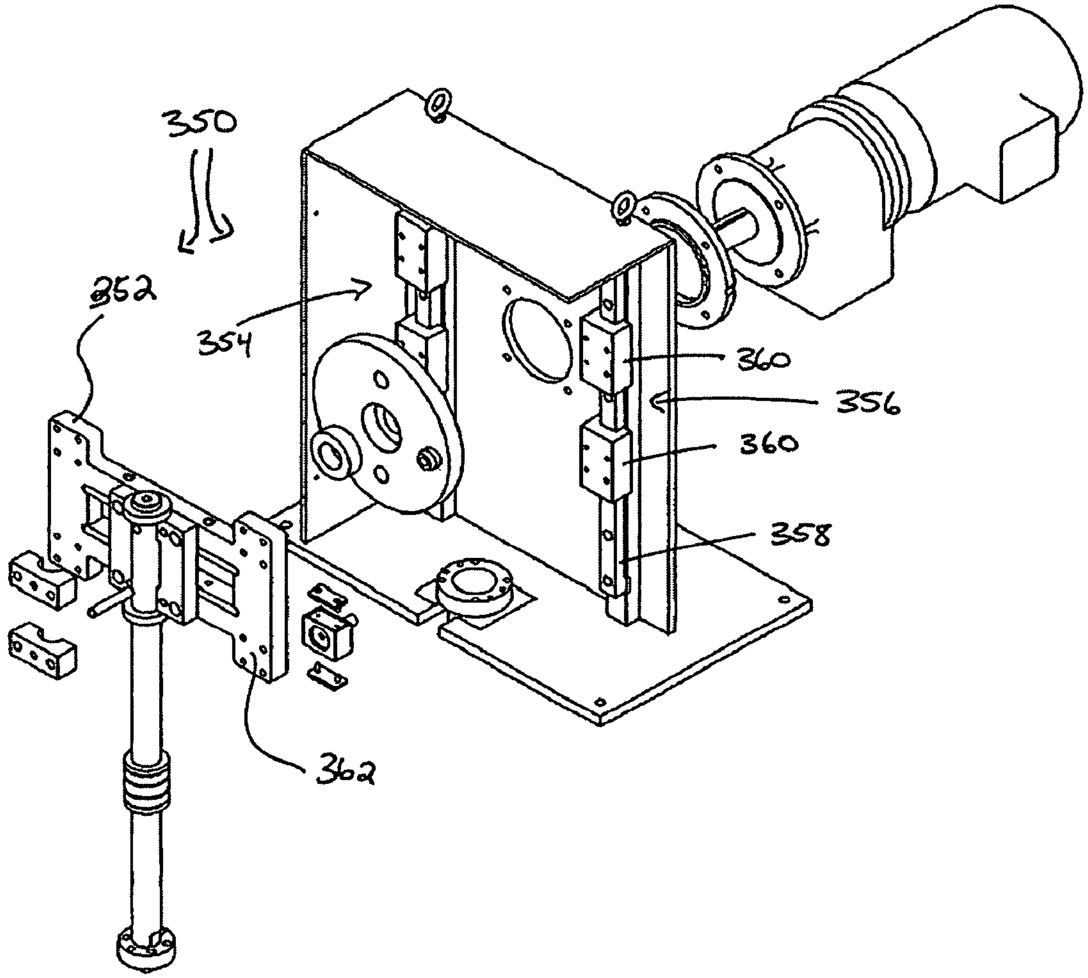
FIG. 22 is an partially exploded perspective view of the reciprocating drive assembly of FIG. 21.

It will be appreciated that other alternative track and saddle member arrangements may be constructed. Referring to FIGS. 21 and 22, there is shown an alternative reciprocating drive assembly 350 generally similar to reciprocating drive assembly 252. The reciprocating drive assembly 350 has, inter alia, a yoke 352 and track-and-saddle type, linear slide assemblies 354 and 356. The linear slide assemblies 354 and 356 are generally similar to the linear slide assemblies 284 and 286 in that each assembly 354, 356 includes a track 358 associated with at least one corresponding saddle member 360. However, the assemblies 354 and 356 differ in that they are fabricated with the saddle members 360 already captively retained on the tracks 358 for sliding engagement therewith. The yoke 352 differs from yoke 278 shown in FIGS. 19 and 20 in that it is of unitary construction and has saddle mounting portions 362 incorporated therein.

Figure 23:
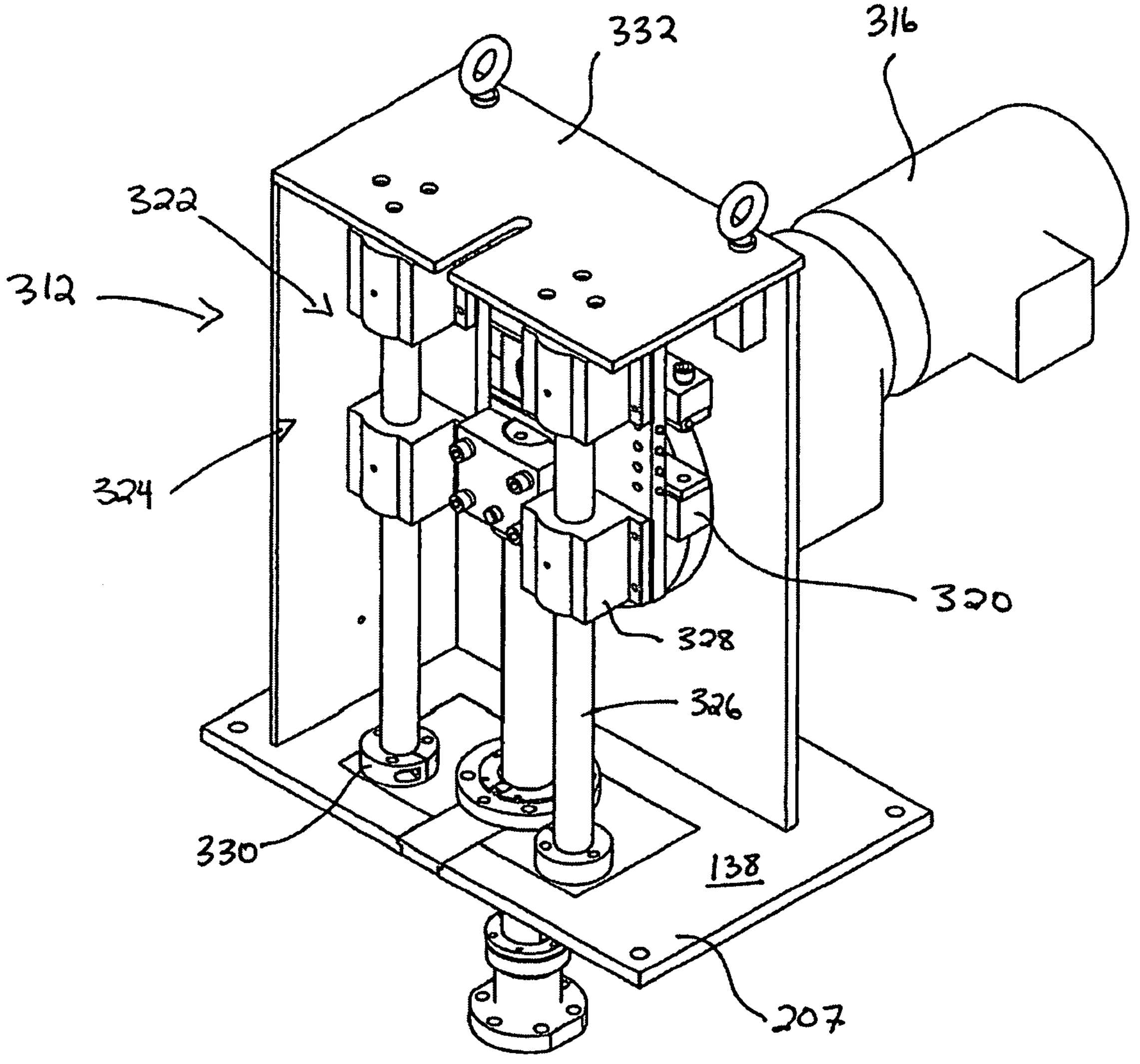
FIG. 23 is a top, right perspective view of an alternate reciprocating drive assembly to that shown in FIG. 19.
Figure 24:
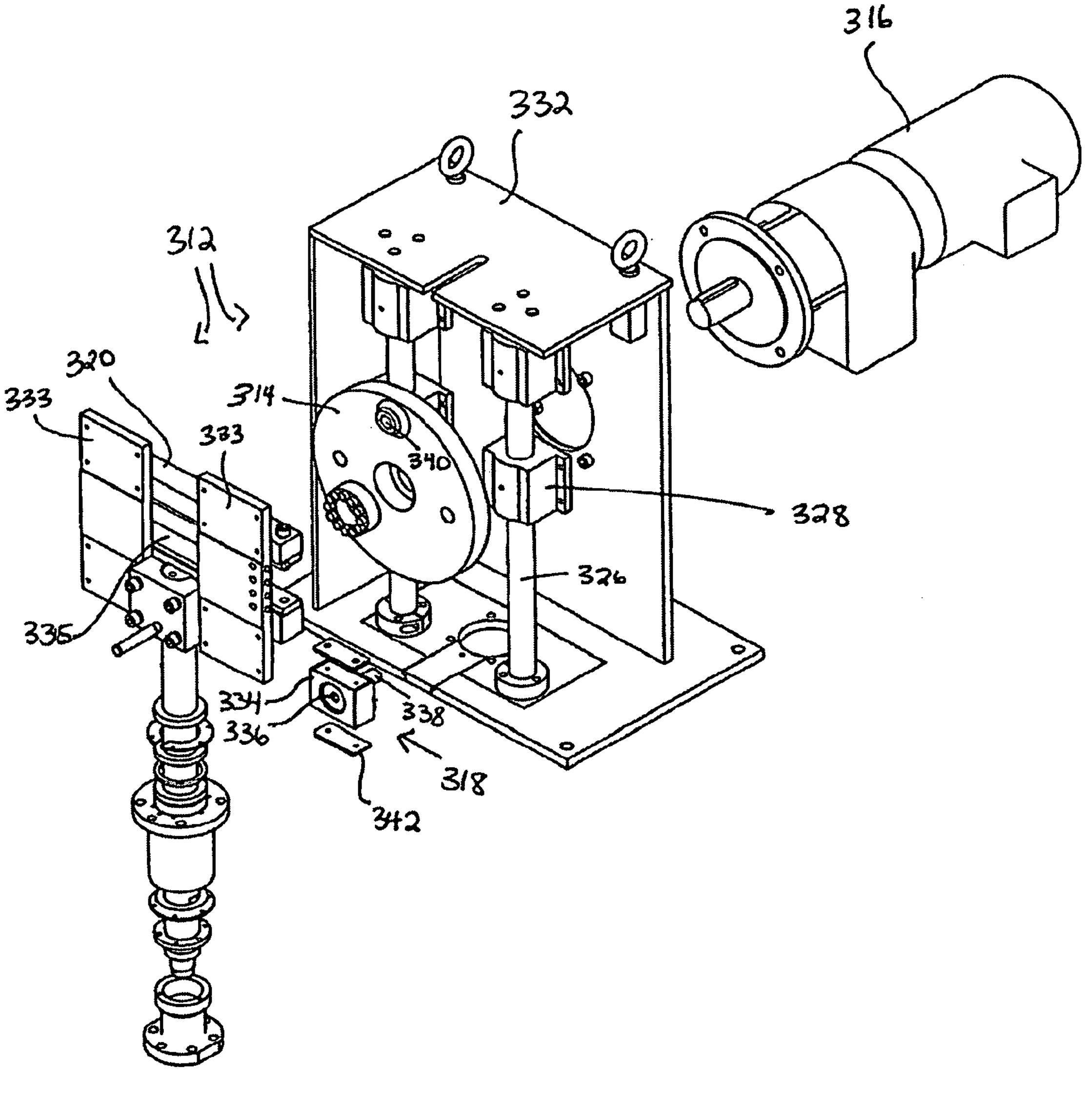
FIG. 24 is a partially exploded perspective view of the reciprocating drive assembly of FIG. 23.

Alternate configurations of a reciprocating drive assembly having dual linear slide assemblies, are also possible. Referring now to FIGS. 23 and 24, there is shown a reciprocating drive assembly 312 generally similar to the reciprocating drive assembly 252 described above. The reciprocating drive assembly 312 includes a flywheel 314, a drive 316, a crank member 318, a yoke 320 and guide means 322 operatively connected to form a scotch yoke assembly 324. The guide means 322 is similar to the guide means 280 in that it also uses a pair of parallel, longitudinally extending, left and right guide assemblies. However, whereas the guide means 280 employs a pair of tracks 294 each associated with at least one saddle member 296, the guide means 322 uses a Thompson shaft arrangement, that is, a pair of guide posts 326 each associated with at least one linear sliding block 328.

Each guide post 326 is mounted within the housing 138 to extend upwardly between the base 207 and a top plate 332 thereof. The guide posts 326 are secured to the base 207 by collar members 330 and fasteners (not shown). Each linear sliding block 328 is mounted in surrounding relation to its associated guide post 326 for sliding engagement therewith. As with the linear assemblies 284 and 286, the mounting members 333 attach the linear sliding blocks 328 with the yoke 320. However, in this embodiment, the linear slide assemblies (consisting of guide posts 326 and linear sliding blocks 328) are located fore of the yoke 320.

While the reciprocating drive assembly 318 operates in a generally similar fashion to the reciprocating drive assembly 252, the manner in which the flywheel 314, the crank member 318 and the yoke 320 co-operate with each other differs. Unlike crank member 276, the crank member 318 does not have an inner axle fixedly connected to the flywheel with an outer roller portion rotatably mounted thereon. The crank member 318 is embodied in a cam follower block 334 adapted and configured for sliding movement within the race 335 defined in the yoke 320. The cam follower block 334 is preferably made of steel and houses therein a roller bearing 336 and an axle 338 rotatively mounted to the roller bearing 336. The axle 338 is received in socket 340 formed in the flywheel 314. Brass wear plates 342 are fastened to the top and bottom surfaces of the cam follower block 334 for improved wear resistance. When the cam follower 334 is mounted within the race 336, the brass wear plates 342 bear against hard steel wear plates (not shown) lining the race 335.

While in the preferred embodiment, a scotch yoke apparatus is utilized to provide linear reciprocating movement, it will be evident that other mechanisms, such as crank shafts, cam and cam follower mechanisms, and swash plates are possible substituents therefor.

Of course, whereas the detailed description herein pertains specifically to the recovery of copper from copper bearing ores, it should also be understood that the present invention may be utilized in other applications wherein SXEW processes are utilized, such as, for example, in the recovery of zinc, nickel, platinum, uranium and gold.

Figure 14:
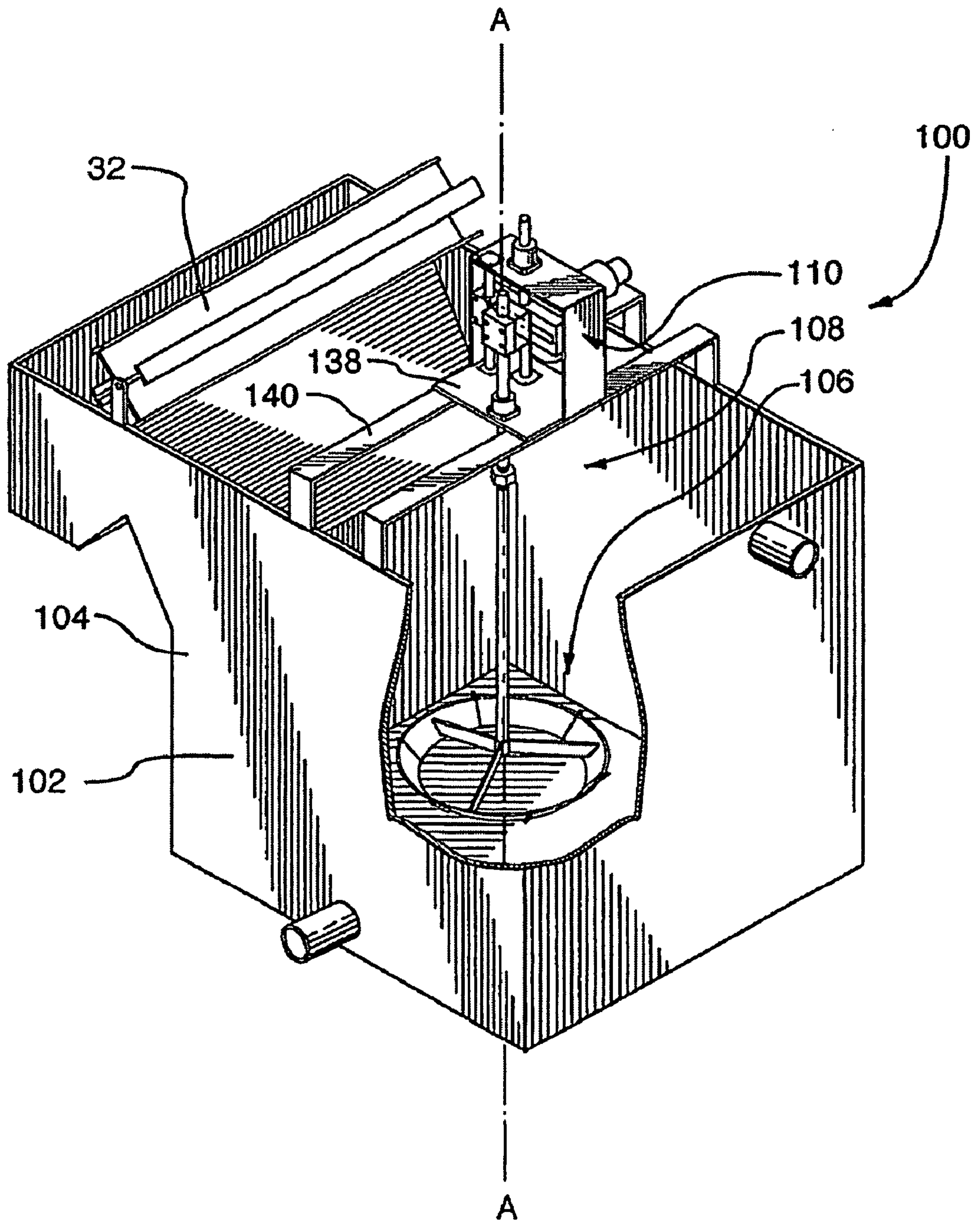
FIG. 14 is a front, top, left side perspective view of a fluid mixing apparatus according to the preferred embodiment of the invention in use in a froth flotation-cell.
Figure 15:
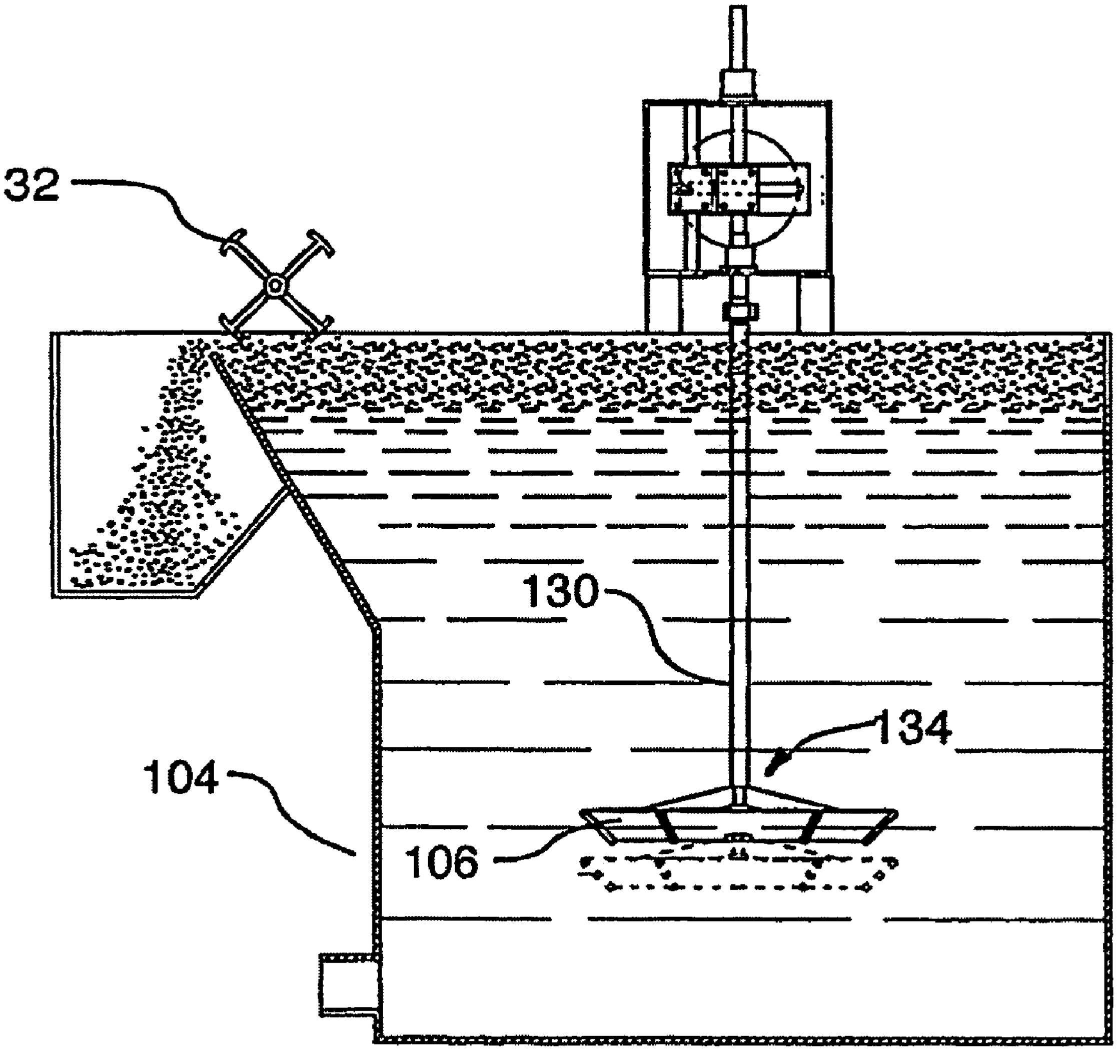
FIG. 15 is a left side cross-sectional view of the structure of FIG. 14.

Moreover, it will be evident that the invention may have advantageous utility even outside the SXEW process, in other mixing applications, such as in the context of a froth flotation cell, illustrated in FIGS. 14 and 15, wherein the fluid mixing apparatus is used to agitate a slurry to form a froth, and a paddle mechanism 32 is operatively mounted to the vessel 102 to scour froths produced thereby.

Figure 16A:
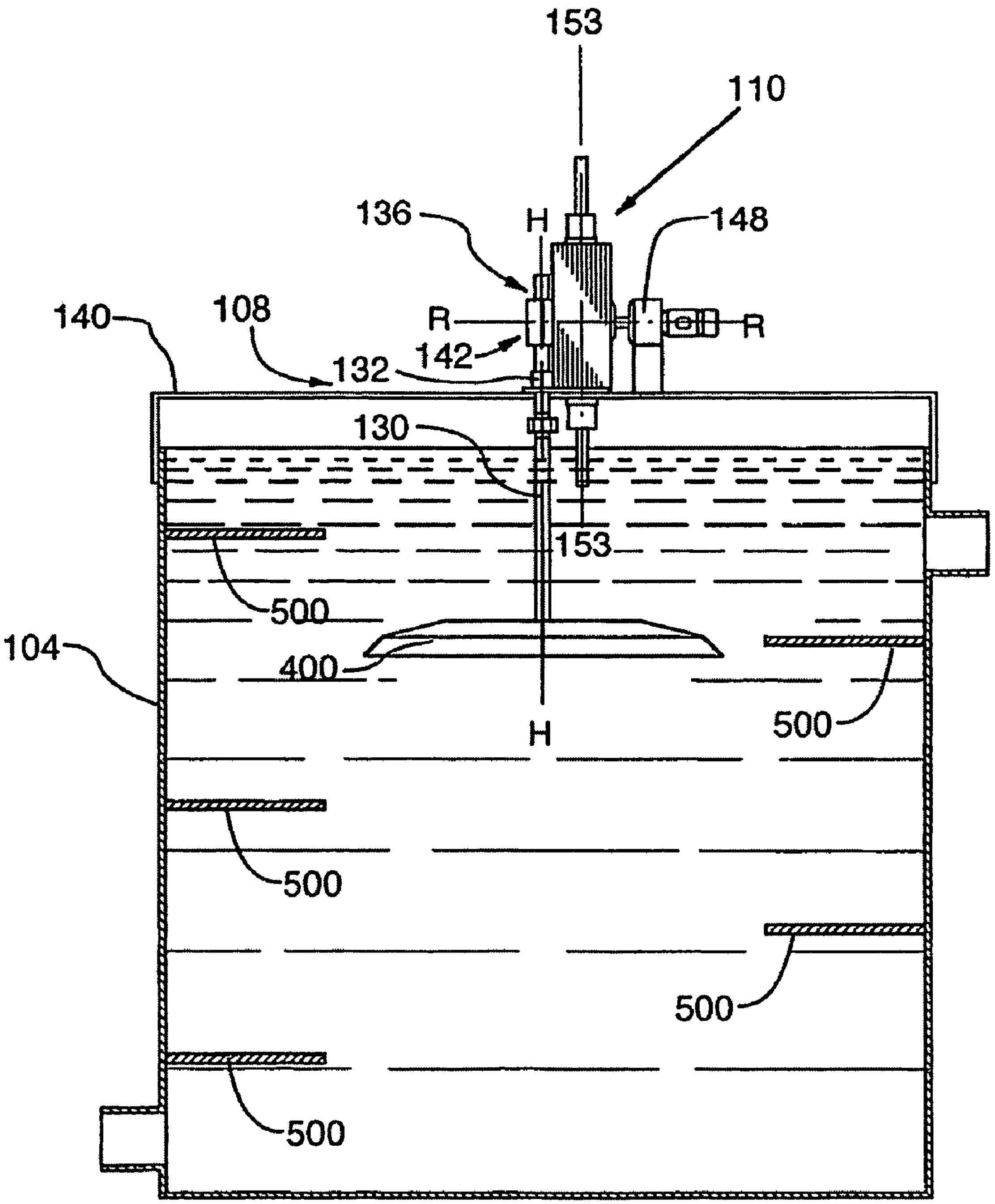
FIG. 16*a* is a side cross-sectional view of an alternate fluid mixing apparatus to that shown in FIG. 3, showing the fluid mixing apparatus mounted within a vessel having baffles disposed therein.
Figure 16B:
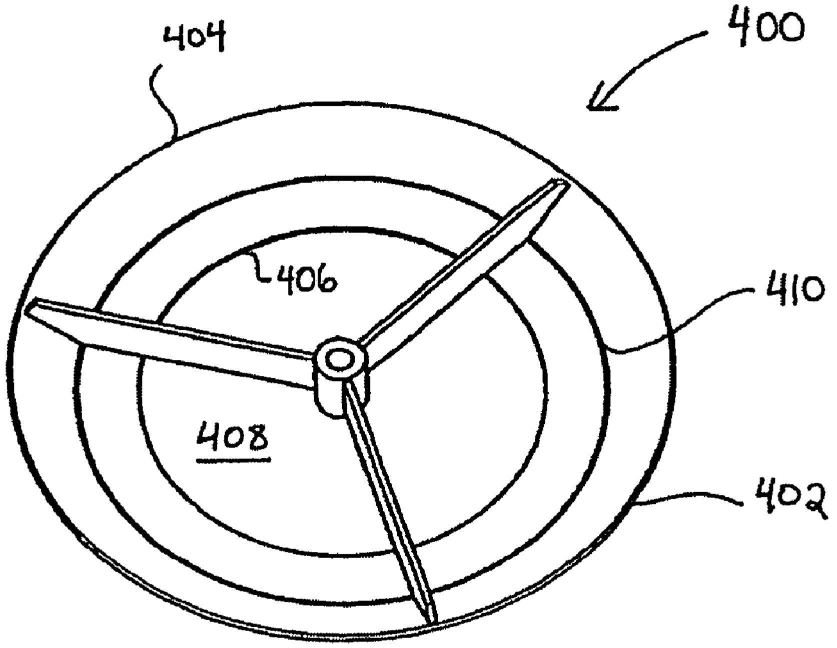
FIG. 16*b* is a top left perspective view of the alternate mixing head shown in FIG. 16*a*.
Figure 16C:
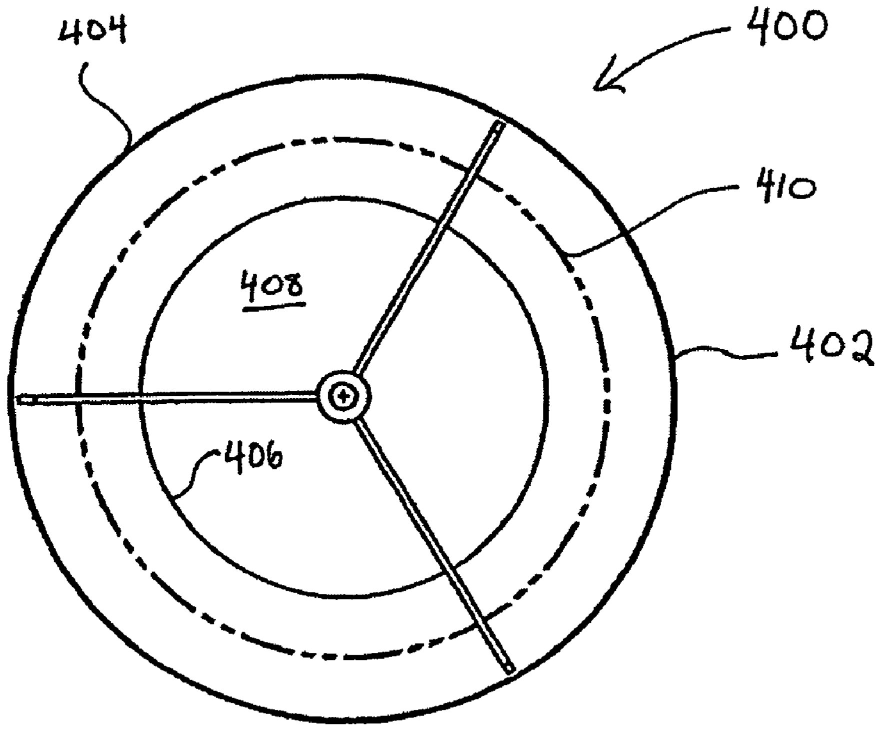
FIG. 16*c* is a bottom plan view of the alternate mixing head shown in FIG. 16*a*.

As shown in FIG. 16*a*, the fluid mixing apparatus can also be employed in a vessel having baffles 500 disposed therein.

It will, of course, also be understood that various other modifications and alterations may be used in the design and manufacture of the mixing apparatus according to the present invention without departing from its spirit and scope. Accordingly, the scope of the present invention should be understood as limited only by the accompanying claims, purposively construed.

We claim:

1. A reciprocating drive assembly for use in a fluid mixer to impart reciprocating movement along a longitudinal axis to a shaft carrying a mixing head for immersion in fluids, the reciprocating drive assembly comprising:

a housing;

a flywheel mounted for rotation about a rotational axis extending substantially normal to the longitudinal axis;

a crank member projecting from the flywheel in a direction parallel to the rotational axis;

a yoke supported by the housing for movement along a yoke axis disposed substantially parallel to the longitudinal axis, the yoke being releasably connected to the shaft, the yoke having a substantially linear race formed therein for receiving the crank member, the race being disposed within the yoke substantially normal to both the rotational axis and the yoke axis;

first and second linear slide assemblies operatively connected to the housing, and to the yoke for sliding engagement therewith along a pair of guide axes extending substantially parallel to the yoke axis, with each of said linear slide assemblies including elongated guide rail member associated with at least one corresponding guide rail following member, with each guide rail member being fixedly mounted to the housing coincident with one of the guide axes, the pair of linear slide assemblies being laterally spaced from each other with the yoke disposed substantially therebetween, with each said guide rail member having upper and lower, spaced-apart guide rail following members associated therewith;

wherein, when the flywheel is rotatively driven, the crank member is caused to translate linearly within the race thereby urging the yoke to slidingly engage the linear slide assemblies and move along the yoke axis to effect longitudinal reciprocating movement of the shaft and the mixing head.

2. A reciprocating drive assembly according to claim 1, wherein:

each linear slide assembly includes a guide post associated with at least one corresponding linear sliding block;

each guide post is fixedly mounted to the housing coincident with one of the guide axes; and each of the at least one linear sliding blocks is rigidly connected to the yoke and slidably moveable relative to its corresponding guide post.

3. A reciprocating drive assembly according to claim 2, wherein:

each guide post has upper and lower, spaced-apart, linear sliding blocks associated therewith.

4. A reciprocating drive assembly according to claim 3, wherein the crank member comprises a cam follower block adapted and configured for sliding movement within said linear race.

5. A reciprocating drive assembly according to claim 4, wherein brass wear plates are removably fastened to each of the top and bottom surfaces of the cam follower block for operative sliding contact with adjacent wear plates lining said linear race.

6. A reciprocating drive assembly according to claim 5, wherein the cam follower block houses a roller bearing with an axle having a first end him and him and rotatively mounted thereto and a second end mounted in a socket formed in the flywheel.

* * * * *